(12) United States Patent
Zeulner et al.

(10) Patent No.: US 12,162,073 B2
(45) Date of Patent: Dec. 10, 2024

(54) DETECTING OPTICAL ANOMALIES ON OPTICAL ELEMENTS USED IN AN ADDITIVE MANUFACTURING MACHINE

(71) Applicants: General Electric Company, Schenectady, NY (US); Concept Laser GmbH, Lichtenfels (DE)

(72) Inventors: Fabian Zeulner, Lichtenfels (DE); Christian Dicken, Bamberg (DE); Justin Mamrak, Loveland, OH (US); Mackenzie Ryan Redding, Mason, OH (US); Bertram Gaerber, Neustadt bei Coburg (DE)

(73) Assignees: General Electric Company, Evendale, OH (US); Concept Laser GmbH, Lichtenfels (DE)

( * ) Notice: Subject to any disclaimer, the term of this patent is extended or adjusted under 35 U.S.C. 154(b) by 0 days.

(21) Appl. No.: 18/448,458

(22) Filed: Aug. 11, 2023

(65) Prior Publication Data

US 2023/0381864 A1    Nov. 30, 2023

Related U.S. Application Data

(63) Continuation of application No. 17/232,648, filed on Apr. 16, 2021, now Pat. No. 11,752,558.

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 12/41* (2021.01); *B22F 12/49* (2021.01);
(Continued)

(58) Field of Classification Search
CPC .......... B22F 10/85; B22F 10/28; B22F 12/41; B22F 12/49; B22F 12/90; B22F 12/45;
(Continued)

(56) References Cited

U.S. PATENT DOCUMENTS

| | | |
|---|---|---|
| 4,469,442 A | 9/1984 | Reich |
| 4,555,179 A | 11/1985 | Langerholc et al. |

(Continued)

FOREIGN PATENT DOCUMENTS

| | | |
|---|---|---|
| CN | 101107882 A | 1/2008 |
| CN | 101541511 A | 9/2009 |

(Continued)

OTHER PUBLICATIONS

Collocott et al, Dictionary of Science and Technology, Revised Edition, Edinburgh, 1974, pp. 200-201.

(Continued)

*Primary Examiner* — Michael J Brown
(74) *Attorney, Agent, or Firm* — Dority & Manning, P.A.

(57) ABSTRACT

An additive manufacturing machine includes an energy beam system configured to emit an energy beam utilized in an additive manufacturing process, and first and second optical elements utilized by, or defining a portion of, the energy beam system and/or an imaging system of the additive manufacturing machine. The imaging system monitors one or more operating parameters of the additive manufacturing process. A light source is configured to emit an assessment beam that follows an optical path incident upon the first and second optical elements. One or more light sensors detect a reflected beam that is either internally reflected by the first optical element or reflectively propagated between the first and second optical elements. A control system determines, based at least in part on assessment data comprising data from the one or more light
(Continued)

sensors, whether at least one of the first and second optical elements exhibits an optical anomaly.

20 Claims, 18 Drawing Sheets

(51) Int. Cl.
    *B22F 12/41*     (2021.01)
    *B22F 12/49*     (2021.01)
    *B22F 12/90*     (2021.01)
    *B33Y 10/00*     (2015.01)
    *B33Y 30/00*     (2015.01)
    *B33Y 50/02*     (2015.01)
    *B22F 10/31*     (2021.01)
    *G02B 26/10*     (2006.01)

(52) U.S. Cl.
    CPC .............. *B22F 12/90* (2021.01); *B33Y 10/00* (2014.12); *B33Y 30/00* (2014.12); *B33Y 50/02* (2014.12)

(58) Field of Classification Search
    CPC ...... B22F 10/10; B22F 10/20; B22F 2999/00; B22F 10/30; B22F 10/31; B33Y 10/00; B33Y 30/00; B33Y 50/02; Y02P 10/25; B08B 3/02; B08B 3/024; B08B 5/02; B08B 5/04; B29C 64/268; B29C 64/386; G02B 26/10; G02B 27/0006
    USPC ......................................................... 700/118
    See application file for complete search history.

(56) References Cited

U.S. PATENT DOCUMENTS

| | | | |
|---|---|---|---|
| 5,404,019 | A | 4/1995 | Ohno et al. |
| 5,489,338 | A | 2/1996 | Fujino |
| 5,574,215 | A | 11/1996 | Bunger et al. |
| 5,615,013 | A | 3/1997 | Rueb et al. |
| 5,724,140 | A | 3/1998 | Haywood |
| 5,812,270 | A | 9/1998 | Hampton et al. |
| 6,437,357 | B1 | 8/2002 | Weiss et al. |
| 6,940,554 | B2 | 9/2005 | Robins et al. |
| 7,151,603 | B2 | 12/2006 | Kellie |
| 8,070,474 | B2 | 12/2011 | Abe et al. |
| 8,229,204 | B2 | 7/2012 | Wagner |
| 8,836,936 | B2 | 9/2014 | Lin |
| 8,897,111 | B1 | 11/2014 | Dekker |
| 8,913,251 | B2 | 12/2014 | Tin |
| 9,310,248 | B2 | 4/2016 | Karlsen et al. |
| 9,909,997 | B2 | 3/2018 | Li et al. |
| 10,295,405 | B2 | 5/2019 | Karlsen et al. |
| 10,611,092 | B2 | 4/2020 | Buller et al. |
| 11,752,558 | B2* | 9/2023 | Zeulner .................. B22F 10/28 700/118 |
| 2003/0052105 | A1 | 3/2003 | Nagano |
| 2004/0076481 | A1 | 4/2004 | Jessmore et al. |
| 2006/0043077 | A1 | 3/2006 | Nittner et al. |
| 2007/0175875 | A1 | 8/2007 | Uckelmann et al. |
| 2007/0284547 | A1 | 12/2007 | Sejersen et al. |
| 2008/0131104 | A1 | 6/2008 | Philippi |
| 2010/0019125 | A1 | 1/2010 | Stefani et al. |
| 2013/0270750 | A1 | 10/2013 | Green |
| 2014/0198365 | A1 | 7/2014 | Li |
| 2014/0263209 | A1 | 9/2014 | Burris |
| 2015/0210013 | A1 | 7/2015 | Teulet |
| 2015/0283612 | A1 | 10/2015 | Maeda |
| 2016/0067779 | A1 | 3/2016 | Dautova et al. |
| 2016/0082668 | A1 | 3/2016 | Perret et al. |
| 2016/0114432 | A1 | 4/2016 | Ferrar et al. |
| 2016/0236279 | A1 | 8/2016 | Ashton et al. |
| 2017/0136574 | A1 | 5/2017 | Zenzinger et al. |
| 2017/0341143 | A1 | 11/2017 | Abe et al. |
| 2017/0341183 | A1 | 11/2017 | Buller et al. |
| 2017/0348905 | A1 | 12/2017 | Fey |
| 2018/0079004 | A1 | 3/2018 | Herzog et al. |
| 2018/0257140 | A1 | 9/2018 | Pontiller-Schymura et al. |
| 2018/0370131 | A1 | 12/2018 | Ishikawa et al. |
| 2019/0039318 | A1 | 2/2019 | Madigan et al. |
| 2019/0047226 | A1 | 2/2019 | Ishikawa et al. |
| 2019/0224918 | A1 | 7/2019 | Zheng |
| 2019/0353767 | A1 | 11/2019 | Eberspach et al. |
| 2020/0114580 | A1 | 4/2020 | Hunze et al. |
| 2020/0142042 | A1 | 5/2020 | Hibino et al. |
| 2020/0156319 | A1 | 5/2020 | Dohler |
| 2020/0282657 | A1* | 9/2020 | Wighton ............... B29C 64/245 |
| 2020/0290284 | A1 | 9/2020 | Garber |
| 2022/0111599 | A1 | 4/2022 | Mamrak et al. |
| 2022/0252392 | A1* | 8/2022 | Goodwin ............... G01B 15/04 |

FOREIGN PATENT DOCUMENTS

| | | |
|---|---|---|
| CN | 105128343 A | 12/2015 |
| DE | 20314918 U1 | 2/2005 |
| DE | 102006047794 A1 | 4/2008 |
| DE | 102008037345 A1 | 2/2010 |
| DE | 102012014839 A1 | 1/2014 |
| DE | 102012014840 A1 | 1/2014 |
| DE | 102013208651 A1 | 11/2014 |
| DE | 102013219961 A1 | 4/2015 |
| DE | 102014212246 B3 | 8/2015 |
| DE | 102014005916 A1 | 10/2015 |
| DE | 102015107837 A1 | 11/2016 |
| EP | 1488882 A1 | 12/2004 |
| EP | 2186625 A2 | 5/2010 |
| EP | 2537665 A1 | 12/2012 |
| JP | 2000/313067 A | 11/2000 |
| JP | 2007/536598 A | 12/2007 |
| JP | 2009/006509 A | 1/2009 |
| KR | 20040044753 A | 5/2004 |
| KR | 100709036 B2 | 4/2007 |
| WO | WO2005/106588 A1 | 11/2005 |
| WO | WO2014/180971 A1 | 11/2014 |
| WO | WO2014/199134 A1 | 12/2014 |
| WO | WO2016/103686 A1 | 6/2016 |
| WO | WO2008/146920 A1 | 8/2018 |
| WO | WO2020/102561 A1 | 5/2020 |

OTHER PUBLICATIONS

Lilenfeld, Optical Detection of Particle Contamination on Surfaces: A Review, Aerosol Science and Technology, vol. 5, Issue 2, 1986, pp. 145-165. https://doi.org/10.1080/02786828608959085.

Gebhardt, Generative Fertigungsanlagen, Generative Fertigungsverfahren Rapid Prototyping-Rapid Tooling-Rapid Manufacturing, Germany, 2007, p. 122.

Grimm, Selective Laser Sintering, User's Guide Rapid Protyping, Society of Manufacturing Engineers, United States of America, 2004, pp. 166.

Voltz, Computerwissen von A bis Z Eine komprimierte Fachbegriffesammlung, Computer-Fachbegriffe Von A Bis Z, Germany, 1987, pp. 154-157.

\* cited by examiner

DETECTING OPTICAL ANOMALIES ON OPTICAL ELEMENTS USED IN AN ADDITIVE MANUFACTURING MACHINE

CROSS-REFERENCE TO RELATED APPLICATIONS

This application is a continuation application of U.S. application Ser. No. 17/232,648 filed Apr. 16, 2021, which is hereby incorporated by reference in its entirety.

FIELD

The present disclosure generally pertains to additive manufacturing systems, and more particularly to additive manufacturing systems configured to form three-dimensional objects by irradiating an additive manufacturing material using an energy beam.

BACKGROUND

Additive manufacturing machines may utilize energy beams from an energy beam system to additively manufacture three-dimensional objects. Optical elements along a beam path of an energy beam may possess optical anomalies, such as contaminants and/or damage. These optical anomalies may impact characteristics of the irradiation form the energy beams used to additively manufacture three-dimensional objects.

Accordingly, there exists a need for improved systems and methods of handling optical anomalies on optical elements of an additive manufacturing machine.

BRIEF DESCRIPTION

Aspects and advantages will be set forth in part in the following description, or may be apparent from the description, or may be learned through practicing the presently disclosed subject matter.

In one aspect, the present disclosure embraces additive manufacturing machines. An exemplary additive manufacturing machine may include an energy beam system configured to emit an energy beam utilized in an additive manufacturing process, and one or more optical elements utilized by, or defining a portion of, the energy beam system and/or an imaging system of the additive manufacturing machine. The imaging system may be configured to monitor one or more operating parameters of the additive manufacturing process. The additive manufacturing machine may include a light source configured to emit an assessment beam that follows an optical path incident upon the one or more optical elements, and one or more light sensors configured to detect a reflected beam comprising at least a portion of the assessment beam reflected and/or transmitted by at least one of the one or more optical elements. The additive manufacturing machine may include a control system configured to determine, based at least in part on assessment data comprising data from the one or more light sensors, whether the one or more optical elements exhibit an optical anomaly.

In another aspect, the present disclosure embraces methods of determining an optical anomaly exhibited by an optical element utilized in an additive manufacturing machine. An exemplary method may include emitting, with a light source, an assessment beam that follows an optical path incident upon one or more optical elements, and detecting, with one or more light sensors, a reflected beam comprising at least a portion of the assessment beam reflected and/or transmitted by at least one of the one or more optical elements. An exemplary method may include determining, with a control system, whether the one or more optical elements exhibit an optical anomaly based at least in part on assessment data comprising data from the one or more light sensors. The one or more optical elements may be utilized by, or define a portion of, an energy beam system and/or an imaging system of an additive manufacturing machine. The energy beam system may be configured to emit an energy beam utilized in an additive manufacturing process. The imaging system may be configured to monitor one or more operating parameters of the additive manufacturing process.

In yet another aspect, the present disclosure embraces computer-readable media. An exemplary computer-readable medium may include computer-executable instructions, which when executed by a processor associated with an additive manufacturing system, cause the additive manufacturing system to perform a method in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
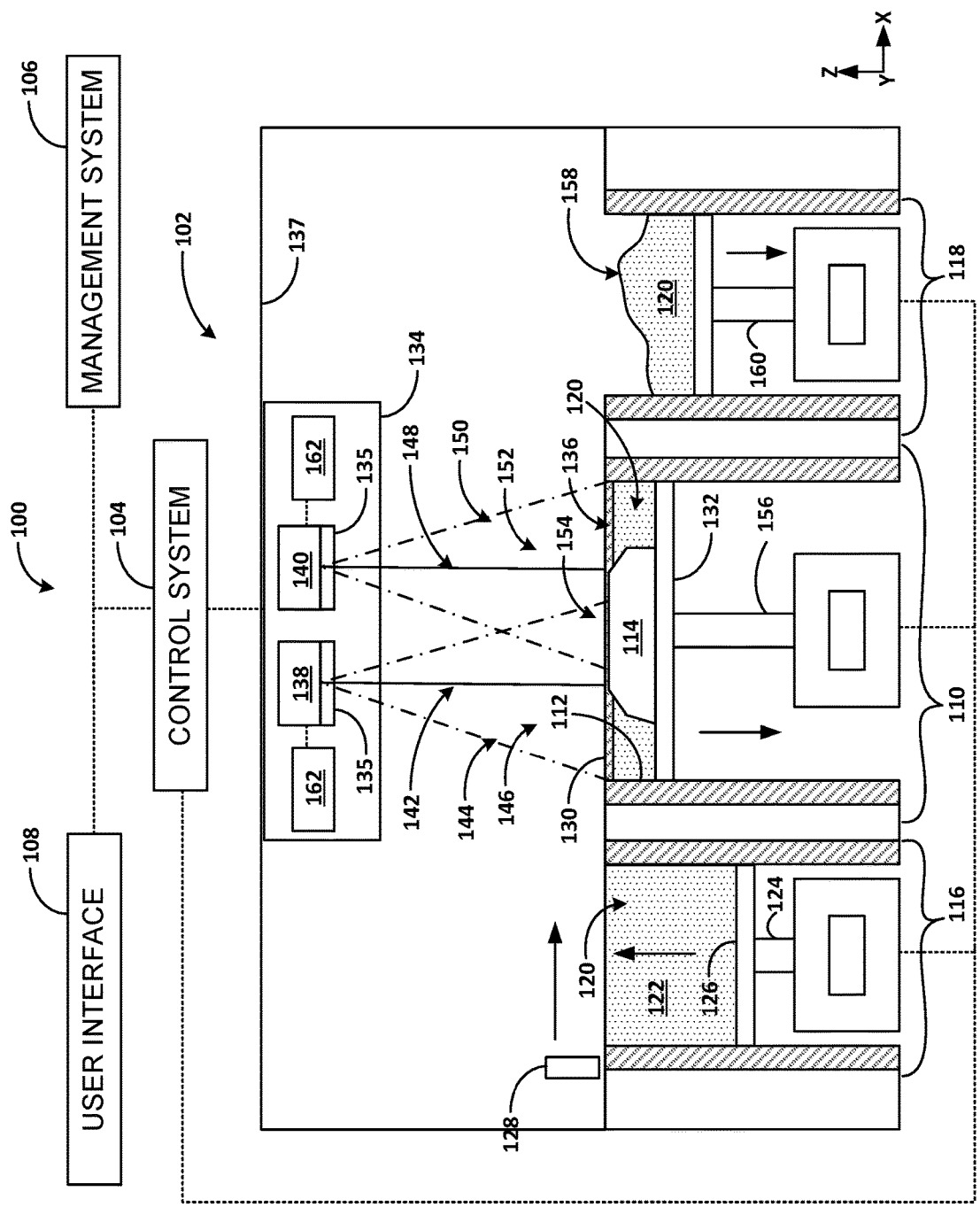
FIG. 1 schematically depicts an exemplary additive manufacturing system.

Repeat use of reference characters in the present specification and drawings is intended to represent the same or analogous features or elements of the present disclosure.

DETAILED DESCRIPTION

The presently disclosed subject matter will now be described in further detail, in some instances with reference to one or more of the drawings. Examples are provided by way of explanation and should not be interpreted as limiting the present disclosure. In fact, it will be apparent to those skilled in the art that various modifications and variations can be made in the present disclosure without departing from the scope of the present disclosure. For instance, features illustrated or described in one portion of the present disclosure can be used with features illustrated or described in another portion of the present disclosure, including with modification and variations thereof. It is intended that the present disclosure covers such modifications and variations as come within the scope of the appended claims and their equivalents.

The present disclosure generally provides systems and methods of detecting optical anomalies on optical elements used in an additive manufacturing machine. Optical elements may exhibit optical anomalies such as debris and/or damage from time to time. Such optical anomalies may interfere with the performance of the optical elements. An energy beam system that utilizes optical elements that have optical anomalies such as debris and/or damage may perform sub-optimally. For example, the optical anomalies may affect an energy beam that passes through the optical elements during additive manufacturing. The optical anomalies may augment one or more properties of the energy beam, which may add complexities to an additive manufacturing process. Additionally, or in the alternative, optical elements utilized by an imaging system to monitor an additive manufacturing process may be affected by optical anomalies. For example, optical anomalies may augment one or more properties of an imaging beam, which may add complexities to the monitoring process performed by the imaging system.

The present disclosure provides systems and methods for determining whether one or more optical elements exhibit an optical anomaly, as well as systems and methods that deal with the possibility that the one or more optical elements may exhibit optical anomalies from time to time.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. An additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

The additive manufacturing machine 102 includes an energy beam system 134 configured to generate a plurality of energy beams such as laser beams or electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically, with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical assembly 135 that includes a plurality of optical elements configured to direct the energy beam onto the build plane 130. The optical assembly 135 may include one or more optical elements, such as lenses through which an energy beam may be transmitted along an optical path from the energy beam source to the build plane. By way of example, an optical assembly 135 may include one more focusing lenses that focus an energy beam on a build plane 130. Additionally, or in the alternative, an optical assembly 135 may include a window, such as a protective glass, that separates one or more components of the energy beam system 134 from a process chamber 137 within which powder material is irradiated by one or more energy beams 142, 148 to additively manufacture a three-dimensional object 114. The window or protective glass may include one or more optical elements, such as lenses or panes, through which an energy beam passes along an optical path to the build plane 130. The window or protective glass may separate the one or more components of the energy beam system from conditions existing within the process chamber 137 of an additive manufacturing machine 102. Such window or protective glass may prevent contaminants associated with the additive manufacturing process, such as powder material, dust, soot, residues from fumes or vapor, and the like, from coming into contact with sensitive components of an energy beam system 134. Accumulation of contaminants upon various optical elements of an optical assembly 135 may adversely affect operation of the energy beam system 134 and/or quality metrics associated with an energy beam system. Additionally, or in the alternative, such contaminants may cause damage to various optical elements of an optical assembly 135. The presently disclosed optical element monitoring systems may be configured to monitor various optical elements of an optical assembly 135 for accumulation of contaminants and/or damage. Additionally, or in the alternative, the presently disclosed optical element monitoring systems may be configured to initiate cleaning, maintenance, and/or replacement of various optical elements of an optical assembly 135.

As shown in FIG. 1, the energy beam system 134 includes a first irradiation device 138 and a second irradiation device 140. The first irradiation device 138 may include a first optical assembly 135, and/or the second irradiation device 140 may include a second optical assembly 135. Additionally, or in the alternative, an energy beam system 134 may include three, four, six, eight, ten, or more irradiation devices, and such irradiation devices may respectively include an optical assembly 135. Regardless of how many irradiation devices may be included in an energy beam system 134, one or more corresponding optical element monitoring systems may be provided to initiate cleaning, maintenance, and/or replacement of various optical elements of an optical assembly 135 associated with the energy beam system 134.

The plurality of irradiation devices 138, 140 may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane region 146. The second irradiation device 140 may generate a second energy beam 148 that is scannable within a second scan field 150 incident upon at least a second build plane region 152. The first scan field 144 and the second scan field 150 may overlap such that the first build plane region 146 scannable by the first energy beam 142 overlaps with the second build plane region 152 scannable by the second energy beam 148. The overlapping portion of the first build plane region 146 and the second build plane region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane region 146 and the second build plane region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114. As sequential layers of the powder bed 136 are melted or fused to one another, a build piston 156 gradually lowers the build platform 132 to make room for the recoater 128 to distribute sequential layers of powder material 120. The distribution of powder material 120 across the build plane 130 to form the sequential layers of the powder bed 136, and/or the irradiation imparted to the powder bed 136, may introduce contaminants, such as powder material, dust, soot, residues from fumes or vapor, and the like, into the environment of the process chamber 137. Such contaminants may accumulate on various optical elements of the optical assembly 135 associated with the energy beam system 134.

As the build piston 156 gradually lowers and sequential layers of powdered material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured. An additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that an additive manufacturing machine may not utilize a powder module 116 and/or an overflow module 118, and that other systems may be provided for handling the powder material 120, including different powder supply systems and/or excess powder recapture systems. However, the subject matter of the present disclosure may be practiced with any suitable additive manufacturing machine without departing from the scope hereof.

Still referring to FIG. 1, an additive manufacturing machine 102 may include an imaging system 162 configured to monitor one or more operating parameters of an additive manufacturing machine 102 and/or one or more operating parameters of an additive manufacturing process. The imaging system may a calibration system configured to calibrate one or more operating parameters of an additive manufacturing machine 102 and/or of an additive manufacturing process. The imaging system 162 may be a melt pool monitoring system. The one or more operating parameters of the additive manufacturing process may include operating parameters associated with additively manufacturing a three-dimensional object 114. The imaging system 162 may be configured to detect an imaging beam such as an infrared beam from a laser diode and/or a reflected portion of an energy beam (e.g., a first energy beam 142 and/or a second energy beam 148).

An energy beam system 134 and/or an imaging system 162 may include one or more detection devices. The one or more detection devices may be configured to determine one or more parameters associated with irradiating the sequential layers of the powder bed 136 based at least in part on the detected assessment beam. One or more parameters associated with irradiating the sequential layers of the powder bed 136 may include irradiation parameters and/or object parameters, such as melt pool monitoring parameters. The one or more parameters determined by the imaging system 162 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam (not shown). An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 162 may include one or more imaging optical elements (not shown), such as mirrors, beam splitters, lenses, and the like, configured to direct an assessment beam to a corresponding detection device.

In addition or in the alternative to determining parameters associated with irradiation the sequential layers of the powder bed 136, the imaging system 162 may be configured to perform one or more calibration operations associated with an additive manufacturing machine 102, such as a calibration operation associated with the energy beam system 134, one or more irradiation devices 138, 140 or components thereof, and/or the imaging system 162 or components thereof.

The imaging system 162 may be configured to project an assessment beam (not shown) and to detect a portion of the assessment beam reflected from the build plane 130. Additionally, and/or in the alternative, the imaging system 162 may be configured to detect an assessment beam that includes radiation emitted from the build plane 130, such as radiation from an energy beam 142, 148 reflected from the powder bed 136 and/or radiation emitted from a melt pool in the powder bed 136 generated by an energy beam 142, 148 and/or radiation emitted from a portion of the powder bed 136 adjacent to the melt pool.

The imaging system 162 may include componentry integrated as part of the additive manufacturing machine 102 and/or componentry that is provided separately from the additive manufacturing machine 102. For example, the imaging system 162 may include componentry integrated as part of the energy beam system 134. Additionally, or in the alternative, the imaging system 162 may include separate componentry, such as in the form of an assembly, that can be installed as part of the energy beam system 134 and/or as part of the additive manufacturing machine 102.

Now turning to FIGS. 2A through 2F, exemplary optical element monitoring systems 200 will be described. An optical element monitoring system 200 may be configured to detect optical anomalies, such as contamination and/or damage, that may be present upon one or more optical elements of an energy beam system 134. An optical element monitoring system 200 may additionally or alternatively be configured to determine one or more operational states and/or one or more remedial events, for example, responsive at least in part to an optical anomaly having been detected and/or responsive to an absence of an optical anomaly. FIGS. 2A through 2F show exemplary configurations of an optical element monitoring system 200. The configurations shown are provided by way of example and not to be limiting. Other configurations are also contemplated within the scope of the present disclosure.

As shown in FIGS. 2A through 2F, an optical element monitoring system 200 may be provided as part of an additive manufacturing machine 102. Additionally, or in the alternative, an optical element monitoring system 200 may be provided separately from an additive manufacturing machine 102. An exemplary an optical element monitoring system 200 may include a light source 202 configured to emit an assessment beam 204. The assessment beam 204 may follows an optical path that becomes incident upon one or more optical elements 206. The one or more optical elements 206 may be utilized by, and/or may define a portion of, an energy beam system 134 and/or an imaging system. The energy beam system 134 may be configured to emit an energy beam 142, 148 utilized in an additive manufacturing process. The imaging system 162 may be configured to monitor one or more operating parameters of the additive manufacturing process. The optical element monitoring system 200 may include a light sensor 208 configured to detect at least a portion of the assessment beam 204 reflected and/or transmitted by the one or more optical elements 206. The optical element monitoring system 200 may include a control system 104. The control system 104 may be configured to determine whether the one or more optical elements 206 exhibit an optical anomaly based at least in part on assessment data. The assessment data may include data from the light sensor 208. The data from the light sensor 208 may include subsequent data generated based at least in part on the data from the light sensor 208.

The optical element monitoring system 200 may include a scanner 210 configured to scan or orient the assessment beam 204 to various scanner positions mapped to a scan field 212 corresponding to the one or more optical elements 206. The scanner position may include discrete scanner positions and/or a scan path that follows a predetermined pattern or a random pattern. The assessment beam 204 may follow a beam path from the scanner 210 that becomes incident upon the one or more optical elements 206 within the scan field 212. The one or more optical elements 206 may include lenses, windows, filters, apertures, mirrors, or the like. The control system 104 may be configured to determine a beam incidence location 214 of the assessment beam 204 based at least in part on a scanner position corresponding to data from the light sensor 208 indicative of a reflected beam 216 propagating from the one or more optical elements 206 having been detected by the light sensor 208. The data from the light sensor 208 may include subsequent data generated based at least in part on the data from the light sensor 208. The beam incidence location 214 may include a location upon which the assessment beam 204 becomes incident upon at least one of the one or more optical elements 206 and/or a location from which a reflected portion of the assessment beam 204 propagates from at least one of the one or more optical elements 206. The beam incidence location 214 may be determined by mapping the scanner position to the data from the light sensor 208, for example, based at least in part on the timing of the scanner position and the timing of the corresponding data from the light sensor.

A reflected portion of the assessment beam 204 is sometimes referred to herein as a reflected beam 216. The reflected beam 216 may propagate from an assessment beam 204 reflected by one or more optical elements 206 before becoming incident upon a light sensor 208. In addition to being reflected, the reflected beam 216 may be transmitted and/or refracted by the one or more optical elements 206, before and/or after being reflected. The light sensor 208 may be configured to detect a reflected beam 216 that has been reflected, refracted, and/or transmitted by one or more optical elements 206. The light sensor 208 may detect a reflected beam 216 from an assessment beam 204 reflected by an optical element 206 generally, and/or a reflected beam 216 from an assessment beam 204 reflected by a specific surface of the optical element 206. A light sensor 208 may be configured to detect a reflected beam 216 from an assessment beam 204 reflected by a proximal surface 218 of an optical element 206. Additionally, or in the alternative, a light sensor 208 may be configured to detect a reflected beam 216 from an assessment beam that is reflected by a distal surface 220 of an optical element 206. For example, FIG. 2A, FIG. 2B, FIG. 2C, FIG. 2D, FIG. 2E, and FIG. 2F respectively show a first reflected beam 216 propagating from a proximal surface 218 of an optical element 206 and a second reflected beam 216 propagating from a distal surface 220 of the optical element 206. As used herein, the terms proximal and distal refer to a position along a beam path relative to a light source 202. Thus, a measuring beam 204 emitted by a light source 202 will become incident upon a proximal surface 218 of an optical element 206 before becoming incident upon a distal surface 220 of an optical element.

In addition, or in the alternative to detecting a reflected beam 216 propagating from a proximal surface 218 and/or a distal surface 220 of an optical element 206, a light sensor 208 may be configured to detect a reflected beam 216 from an assessment beam 204 reflected by a proximal optical element 222 and/or a distal optical element 224. With the proximal and distal terminology used herein, a measuring beam 204 emitted by a light source 202 will become incident upon a proximal optical element 222 before becoming incident upon a distal optical element 224. The light sensor 208 may be configured to detect a reflected beam 216 propagating from a proximal optical element 222 and/or a distal optical element 224 regardless of whether the assessment beam 204 was reflected by a proximal surface 218 or a distal surface 220 of the optical element 206, or both. The light sensor 208 may be configured to detect a reflected beam 216 propagating from a proximal surface 218 of a proximal optical element 222 and/or a reflected beam 216 propagating from a distal surface 220 of a proximal optical element 222. Additionally, or in the alternative, the light sensor 208 may be configured to detect a reflected beam 216 propagating from a proximal surface 218 of a distal optical element 224 and/or a reflected beam 216 propagating from a distal surface 220 of a distal optical element 224. By way of example, FIG. 2E, and FIG. 2F respectively show a first reflected beam 216 propagating from a proximal surface 218 of a proximal optical element 222 and a second reflected beam 216 propagating from a proximal surface 218 of a distal optical element 224. As another example, FIG. 2F shows a third reflected beam 216 propagating from a distal surface 220 of a proximal optical element 222 and a fourth reflected beam propagating from a distal surface 220 of a distal optical element 224.

As shown in FIGS. 2A-2F, in addition or in the alternative to detecting a reflected beam 216 from an assessment beam 204 reflected by one or more optical elements 206, a light sensor 208 may be configured to detect a reflected beam 216 from an assessment beam 204 reflected by a build plane 130 defined by a build platform 132 and/or a powder bed 136. The control system 104 may be configured to determine a beam incidence location 214 of the assessment beam 204 based at least in part on a position of a scanner 210 corresponding to data from the light sensor 208 indicative of the light sensor 208 having detected a reflected beam 216 propagating from the build plane 130 having been detected by the light sensor 208. indicative of a reflected beam 216 propagating from the one or more optical elements 206 having been detected by the light sensor 208.

The optical element monitoring system 200 may include, or utilize, dedicated or purpose-build componentry configured to perform respective operations of the optical element monitoring system 200. Additionally, or in the alternative, the optical element monitoring system 200 may utilize preexisting componentry of an additive manufacturing machine 102, such as componentry of an energy beam system 134 and/or componentry of an imaging system 162. The various components that make up an optical element monitoring system 200 may be included as part of an energy beam system 134 and/or an imaging system 162. For example, one or more components of an energy beam system 134 and/or an imaging system 162 may be utilized for one or more operations of an optical element monitoring system 200. Additionally, or in the alternative, one or more components of an optical element monitoring system 200 may be provided as separate components.

The optical element monitoring system 200 may include, or utilize, one or more components of an energy beam system 134. For example, the optical element monitoring system 200 may include, or utilize, one or more irradiation devices 138, 140, including one or more energy beam sources, optical elements, and/or scanners, respectively defining a part of and/or utilized by an energy beam system 134. Additionally, or in the alternative, the optical element monitoring system 200 may include, or utilize, one or more components of an imaging system 162. For example, the optical element monitoring system 200 may include, or utilize, one or more light sources, optical elements, and/or sensor, respectively defining a part of and/or utilized by an optical element monitoring system 200.

The light source 202 may include any suitable light emitting device, such as one or more light emitting diodes (LED), an LED array, one or more laser diodes, a laser diode array, and so forth. The light source 202 may be configured to emit any suitable electromagnetic radiation, which may also be referred to as "light", including any wavelength or wavelength range, such as infrared light, visible light, and/or ultraviolet light. An irradiation device 138, 140 may include, or may be utilized as, the light source 202 of an optical element monitoring system 200. The light sensor 208 may include any suitable sensor device, such as a camera, an image sensor, a photo diode assembly, or the like. For example, the light sensor 208 may include charge-coupled device (e.g., a CCD sensor), an active-pixel sensor (e.g., a CMOS sensor), a quanta image device (e.g., a QIS sensor), or the like. The light sensor 202 of the optical element monitoring system 200 may include, or may be utilized as, a light source of an imaging system 162. A detection device of an imaging system 162 may include, or may be utilized as, the light sensor 208 of an optical element monitoring system 200. Additionally, or in the alternative, the light sensor 208 of the optical element monitoring system 200 may include, or may be utilized as, a detection device of an imaging system 162. For example, the light sensor 208 may be configured for melt pool monitoring, such as a pyrometer or the like. The scanner 210 may include any suitable scanner device, such as a galvanometric scanner, an acousto-optic modulator, an electro-optic modulator, a phase array scanner, or the like. The scanner 210 of the optical element monitoring system 200 may be utilized for scanning an energy beam 142, 148 from an irradiation device 138, 140 upon the build plane 130. One or more of the respective components of the optical element monitoring system 200 may be supported by a frame 225. The frame 225 may define a portion of an additive manufacturing machine 102, and/or a portion of an energy beam system 134, and/or a portion of an imaging system 162.

During operation of the optical element monitoring system 200, an assessment beam 204 may be incident upon one or more optical elements 206, such as lenses, windows, filters, apertures, mirrors, or the like, of an optical assembly 135. The optical assembly 135, and/or the one or more optical elements 206, may be supported by a frame 225. The frame 225 and/or the optical assembly 135 may define a portion of an additive manufacturing machine 102, and/or a portion of an energy beam system 134, and/or a portion of an imaging system 162. The one or more optical elements 206 may include a window configured to separate components of an energy beam system 134 and/or an imaging system 162 from a process chamber 137 of an additive manufacturing machine 102. The optical assembly 135 and/or the frame 225 may support one or more windows that separate one or more components of the energy beam system 134 from the process chamber 137. Additionally, or in the alternative, the one or optical elements 206 may include one or more lenses of an energy beam system 134 and/or an imaging system 162, such as one or more lenses configured to focus and/or direct an energy beam 142, 148 onto the build plane 130, and/or one or more lenses configured to focus and/or direct an imaging beam to a detection device of an imaging system 162. The optical assembly 135 and/or the frame 225 may support one or more lenses configured to focus and/or direct an energy beam 142, 148 onto the build plane 130, and/or one or more lenses configured to focus and/or direct an imaging beam to a detection device of an imaging system 162.

At least a portion of the assessment beam 204 may be reflected by the one or more optical elements 206 of the optical assembly 135, providing a reflected beam 216 that may become incident upon a light sensor 208. Additionally, or in the alternative, at least a portion of the assessment beam 204 may be transmitted and/or refracted by the one or more optical elements 206 of the optical assembly 135 to provide a reflected beam 216 that may become incident upon the light sensor 208. The scanner 210 may be configured to scan the assessment beam 204 across at least a portion of the scan field 212. The light sensor 208 may be configured to generate assessment data, and/or to provide a signal from which assessment data may be generated. The assessment data and/or the data from the light sensor 208 representative of the portion of the assessment beam incident upon the light sensor 208. A signal may be correlated to a characteristic of light from the assessment beam being reflected and/or transmitted by one or more optical elements 206 and becoming incident upon the light sensor 208. Additionally, or in the alternative, an image of one or more optical elements 206 of the optical assembly 135 may be generated from the assessment data. One or more optical anomalies may be determined from the assessment data, the signal, and or the image of the one or more optical elements 206. An image of the one or more optical anomalies may be generated from the assessment data.

Figure 2A:
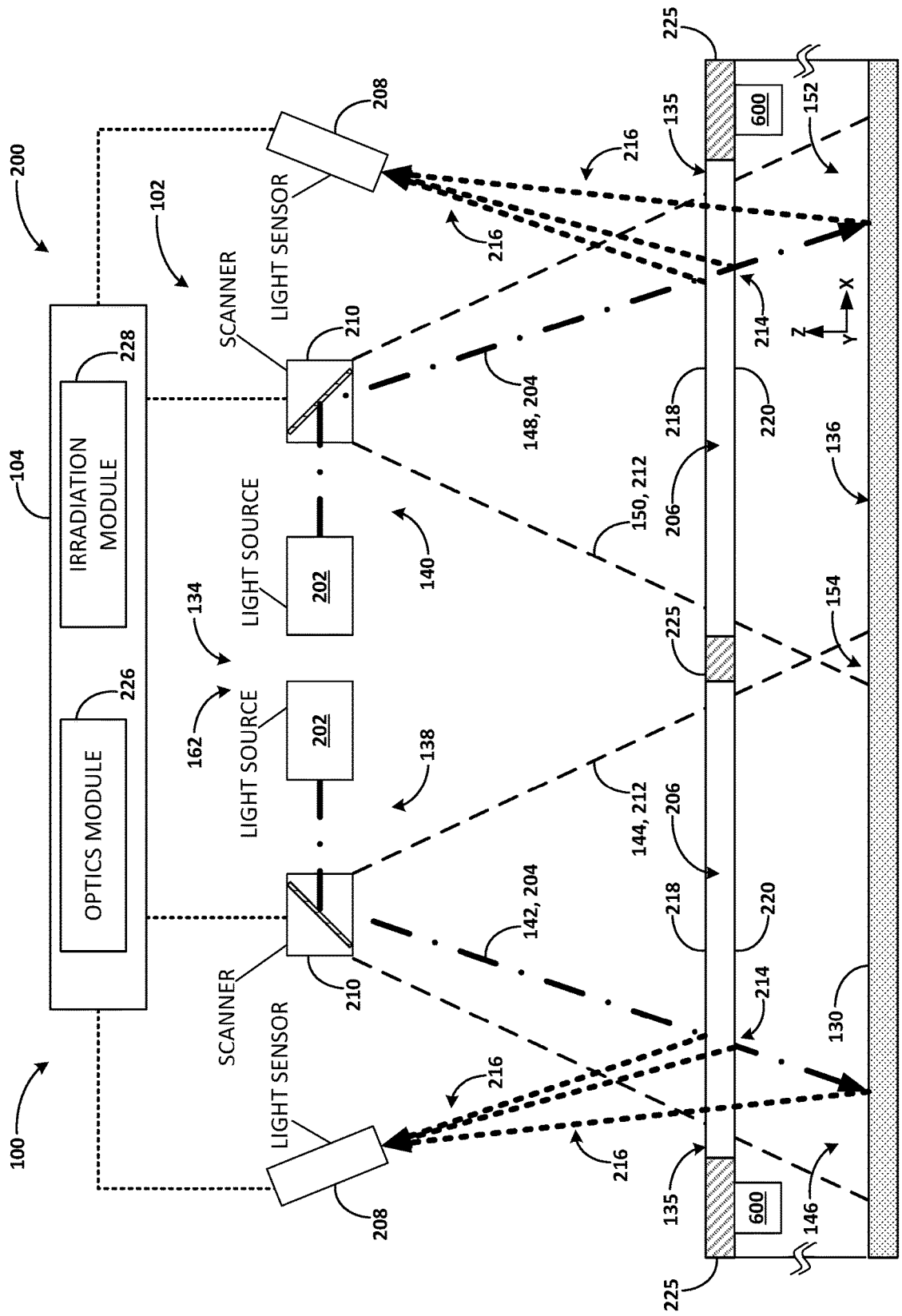
FIGS. 2A-2F schematically depict cross-sectional views of exemplary optical assemblies.
Figure 2B:
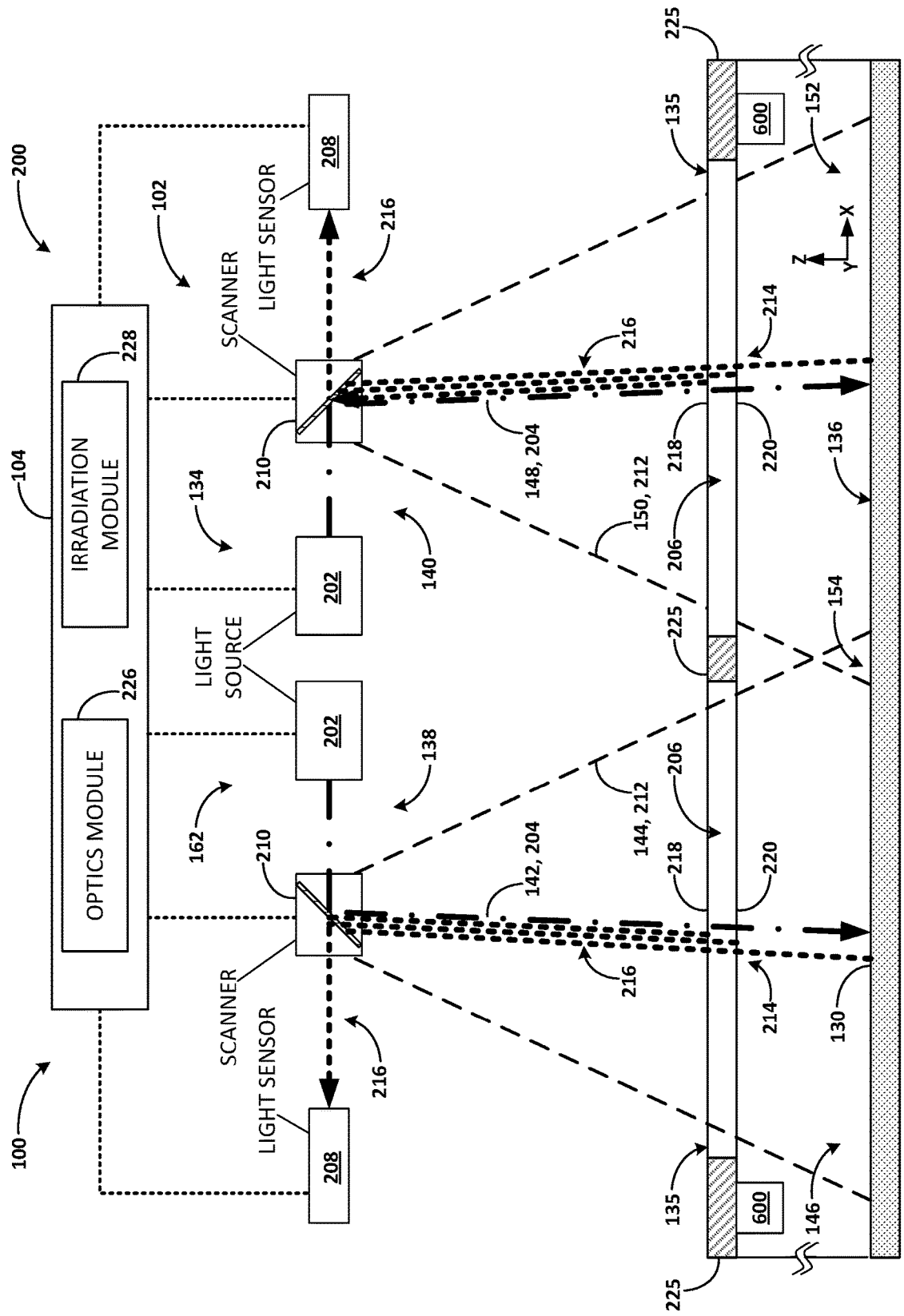
Figure 2C:
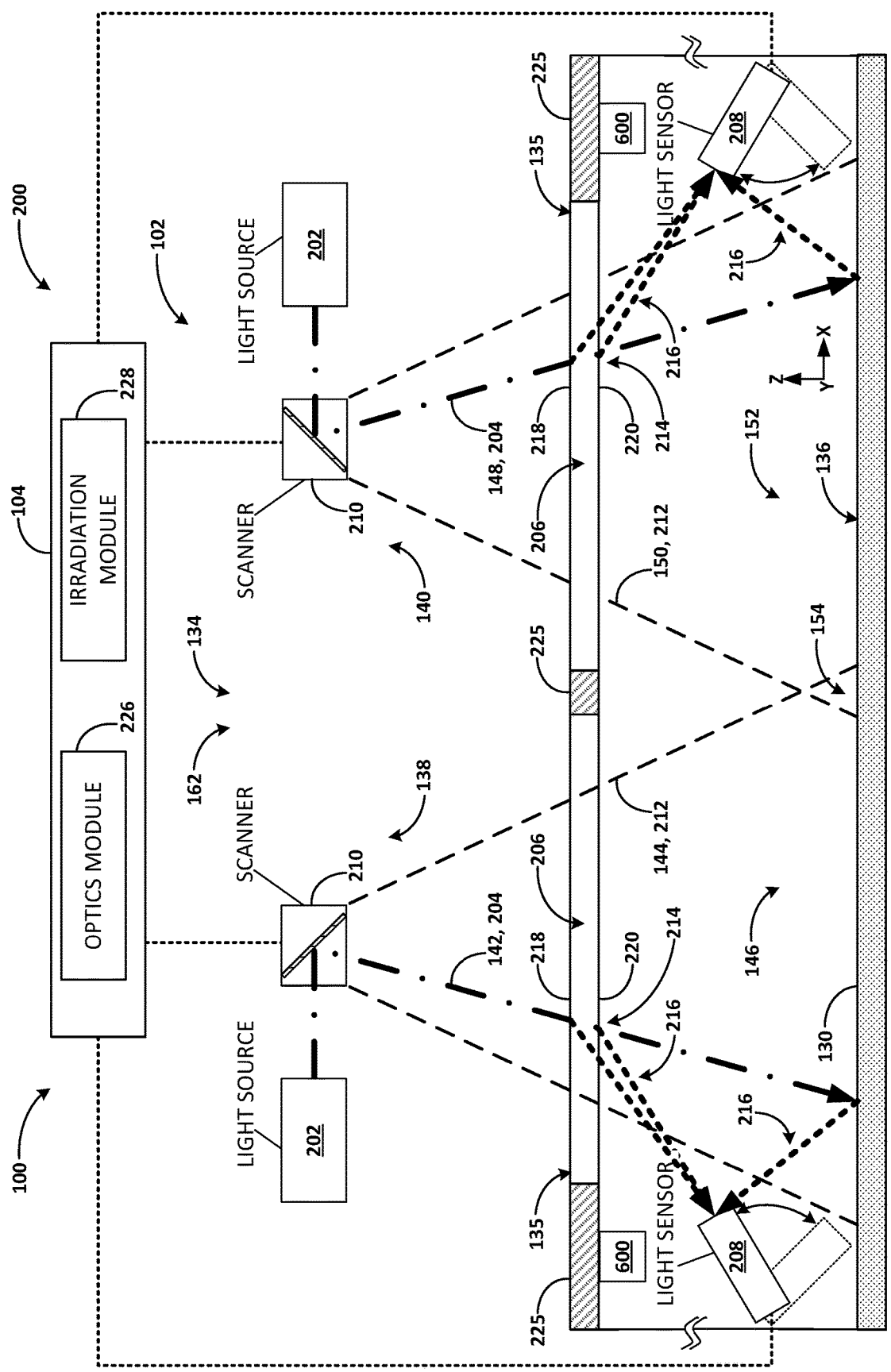
Figure 2D:
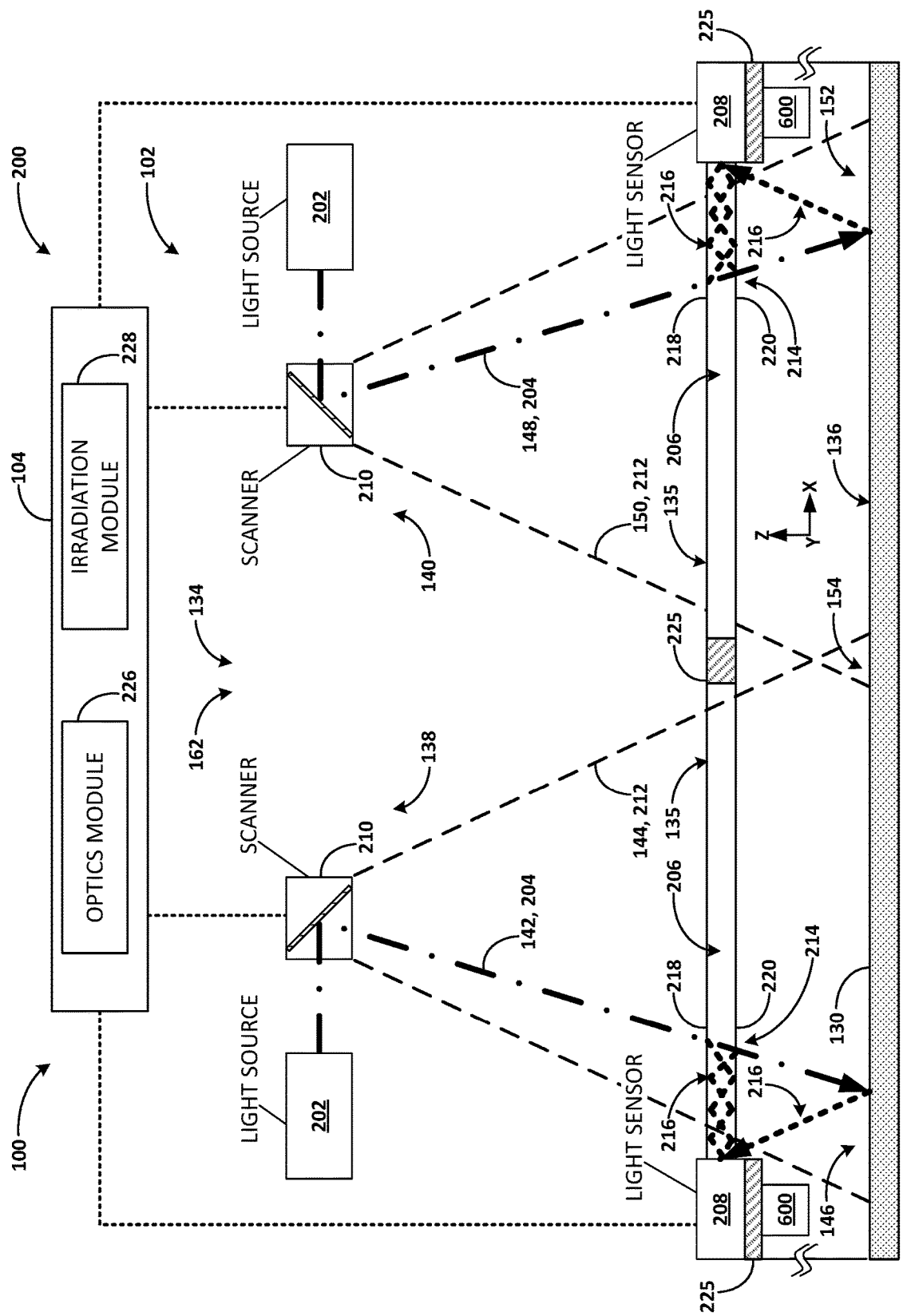
Figure 2E:
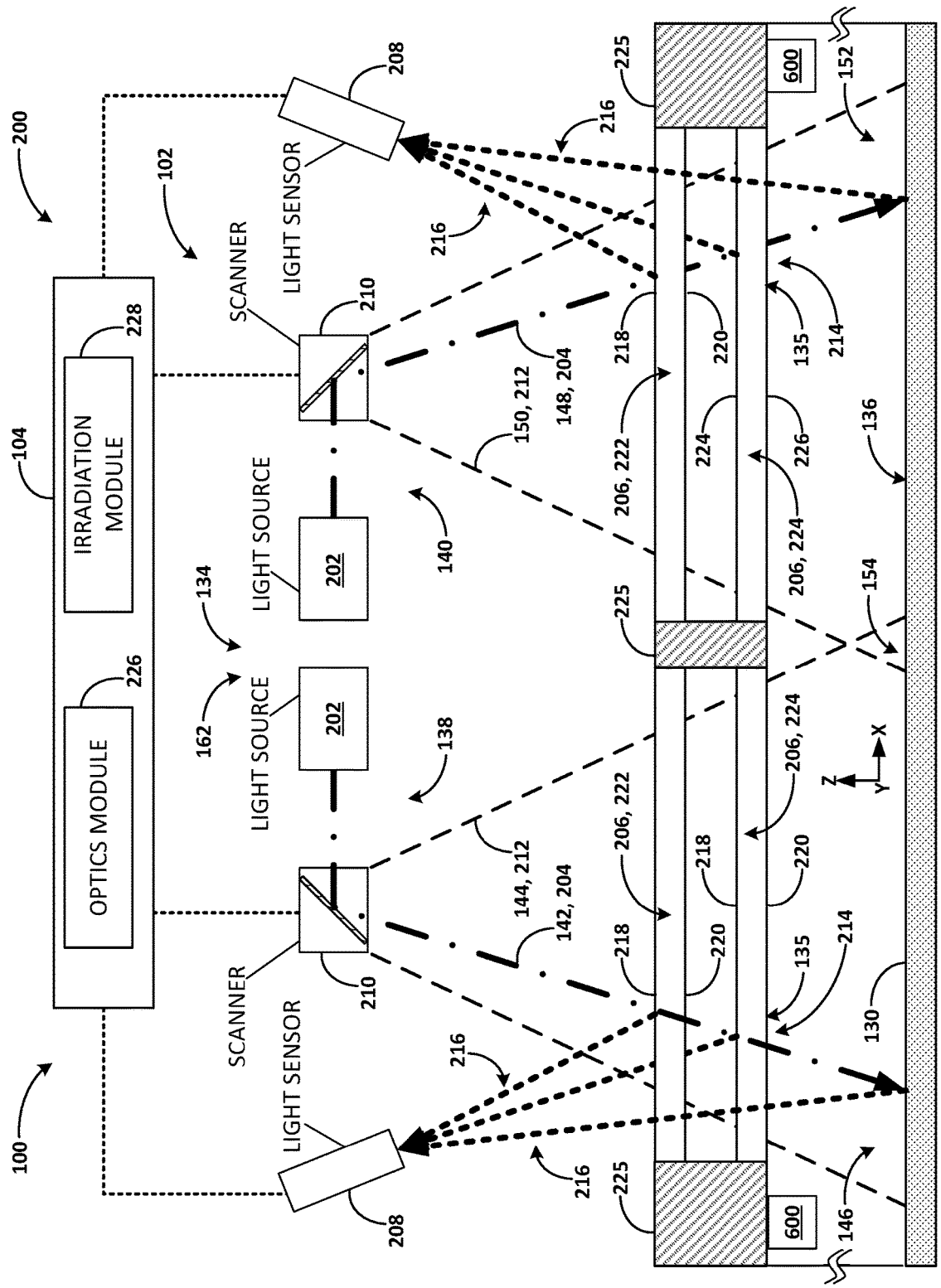
Figure 2F:
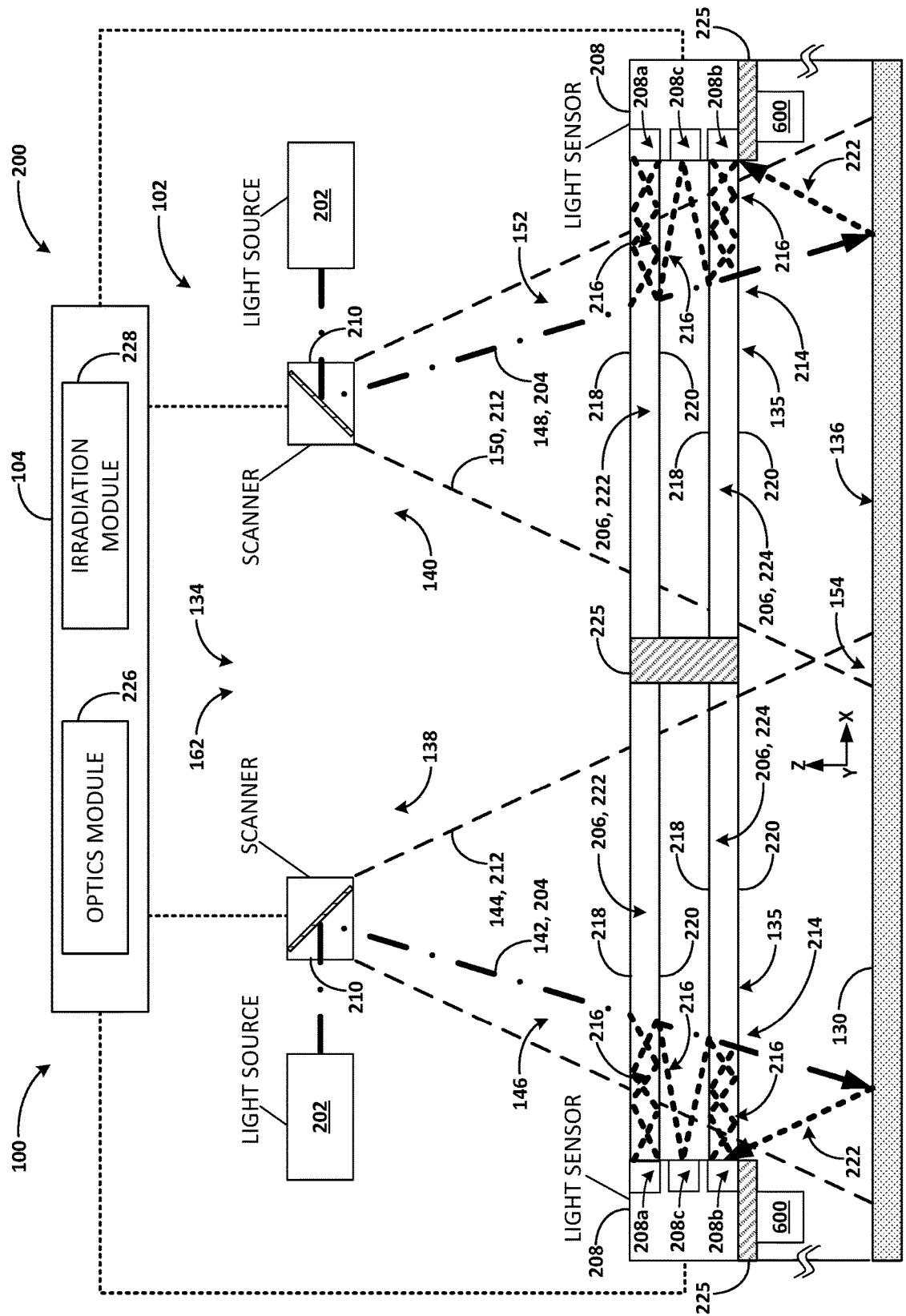

FIGS. 2A-2F show exemplary configurations for one or more lights sensors 208 of an optical element monitoring system 200. As shown in FIGS. 2A and 2E, a light sensor 208 may be positioned off-axis relative to the optical path of the assessment beam 204 incident upon the one or more optical elements 206, such that the reflected beam 216 follows an optical path that diverges from the optical path of the assessment beam 204 incident upon the one or more optical elements 206. Additionally, or in the alternative, as shown in FIG. 2B, the light sensor may be positioned on-axis relative to the optical path of the assessment beam 204 incident upon the one or more optical elements 206, such that the reflected beam 216 follows an optical path that inversely parallels the optical path incident upon the one or more optical elements 206. As shown in FIG. 2C, the light source 202 may be positioned within the process chamber 137. The light sensor 208 may be movably positioned within the process chamber 137. For example, the light sensor 208 may be positioned at least partially facing the one or more optical elements 206 for an optical element monitoring operation, and/or the light sensor 208 may be positioned at least partially facing the build plane 130 for an additive manufacturing operation, such as a melt pool monitoring operation. As shown in FIG. 2D, a light sensor 208 may be configured to detect at least a portion of the assessment beam 204 internally reflected and/or transmitted by an optical element 206, such as by the internal surface boundaries of the optical element 206.

As shown in FIGS. 2E and 2F, an optical element monitoring system 200 may include a light sensor 208 configured to detect a reflected beam 216 propagating from one or more of a plurality of optical elements 206. For example, as shown, a light sensor 208 may be configured to detect reflected beam 216 a proximal optical element 222. Additionally, or in the alternative, the light sensor 208 may detect at least a reflected beam 216 propagating from a distal optical element 224, such as after having been transmitted and/or refracted by the proximal optical element 222. As shown in FIG. 2F, a when an optical element monitoring system 200 includes a plurality of optical elements 206, a light sensor 208 may be configured to detect a reflected beam 216 that is internally reflected and/or transmitted through an optical element 206, and/or a light sensor 208 may be configured to detect a reflected beam 216 propagating between internal boundaries of adjacent optical elements 206. For example, a first light sensor 208a may be configured to detect a first reflected beam 216 that is internally reflected and/or transmitted through a proximal optical element 222, and/or a second light sensor 208b may be configured to detect a second reflected beam 216 that is internally reflected and/or transmitted through a distal optical element 224. Additionally, or in the alternative, a third light sensor 208c may be configured to detect a third reflected beam 216 propagating between a distal surface 220 of the proximal optical element 222 and a proximal surface 218 of the distal optical element 224.

Still referring to FIGS. 2A through 2F, an optical element monitoring system 200 may include a plurality of light sources 202 and/or a plurality of corresponding light sensors 208. For example, a first light source 202 may be configured to scan a first assessment beam 204 with a first scanner 210 across a first scan field 144, 212 with respect to a first one or more optical elements 206. A first irradiation device 138 may serve as the first light source 202. A first energy beam 142 from the first irradiation device 138 may serve as the first assessment beam 204. The first light sensor 208 may be configured and arranged to detect at a first reflected beam 216 the first one or more optical elements 206. The first one or more optical elements 206 may be associated with, and/or included as part of, a first irradiation device 138. For example, a first energy beam 142 from the first irradiation device 138 may pass through the first one or more optical elements 206 along an optical path between an energy beam source and a build plane 130. Additionally, or in the alternative, the first one or more optical elements 206 may be associated with, and or included as part of, a first imaging system 162. For example, a first reflected beam 216 may pass through the first one or more optical elements 206 along an optical path of the first imaging system 162.

Additionally, or in the alternative, a second light source 202 may be configured to scan a second assessment beam 204 with a second scanner 210 across a second scan field 150, 212 with respect to a second one or more optical elements 206. A second irradiation device 140 may serve as the second light source 202. A second energy beam 148 from the second irradiation device 140 may serve as the second assessment beam 204. A second light sensor 208 may be configured and arranged to detect a second reflected beam 216 propagating from the second one or more optical elements 206. The second one or more optical elements 206 may be associated with, and/or included as part of, a second irradiation device 140. For example, a second energy beam 148 from the second irradiation device 140 may pass through the second one or more optical elements 206 along an optical path between an energy beam source and the build plane 130. Additionally, or in the alternative, the second one or more optical elements 206 may be associated with, and or included as part of, a second imaging system 162. For example, a second assessment beam may pass through the second one or more optical elements 206 along an optical path of the second imaging system 162.

When serving as an assessment beam 204, the first or second energy beam 142, 148 may have an energy level that is less than an energy level utilized by the additive manufacturing machine 102 in an additive manufacturing process, such as to melt or sinter the powder material 120 to form a three-dimensional object 114. The power level of the assessment beam 204 may be selected to be sufficiently high to allow for detection of optical anomalies by the corresponding light sensor 208 but need not provide sufficient power for melting or sintering powder material 120. For example, an assessment beam 204 may be provided at a power level that is from about 1% to 75%, such as from about 1% to about 50%, such as from about 1% to about 20%, or such as from about 10% to about 30%, of a power level of an energy beam 142, 148 utilized by the additive manufacturing machine 102 to melt or sinter the powder material 120 to form a three-dimensional object 114. By way of illustration an energy beam 142, 148 may exhibit a power level of from about 100 Watts (W) to about 1,000 W when additively manufacturing a three-dimensional object 114. A lower power level for the assessment beam 204 may be advantageous, for example, to allow for scanning of optical elements 206 along a beam path that becomes incident upon the powder bed 136 without melting or sintering powder material 120. Further, a lower power level for the assessment beam 204 may be advantageous, for example, to avoid heating contaminants that may present as an optical anomaly to the extent that heating may cause such contaminants from further adhering to and/or damaging an optical element 206.

In addition, or in the alternative, to utilizing an irradiation device 138, 140 as a light source 202, an optical element monitoring system 200 may utilize a light source 202 from an imaging system 162. As another alternative, an optical element monitoring system 200 may include a light source 202 provided as a component separate and/or additional to an irradiation device 138, 140 and/or an imaging system 162. A light source 202 from an imaging system 162, and/or a separate or additional light source 202, may likewise provide an assessment beam 204 that has an energy level that is substantially less than an energy level of an energy beam 142, 148 utilized by an additive manufacturing machine 102 to melt or sinter the powder material 120 to form a three-dimensional object 114. For example, an assessment beam 204 from an imaging system 162 and/or a separate/additional light source 202 may likewise have a power level that is from about 1% to 75%, such as from about 1% to about 50%, such as from about 1% to about 20%, or such as from about 10% to about 30%, of a power level of an energy beam 142, 148 utilized by the additive manufacturing machine 102 to melt or sinter the powder material 120 to form a three-dimensional object 114.

An assessment beam 204 may include a wavelength within the ultraviolet spectrum (about 1 nanometer (nm) to about 400 nm), the visible spectrum (about 400 nm to about 750 nm), the near-infrared spectrum (about 750 nm to about 2.5 micrometers (µm)), and/or the infrared spectrum (about 2.5 µm to about 25 µm). When serving as an assessment beam 204, the first or second energy beam 142, 148 may have a wavelength that differs from a wavelength utilized by the additive manufacturing machine 102 to melt or sinter the powder material 120 to form a three-dimensional object 114. By way of comparison, an energy beam 142, 148 may have a wavelength of from about 900 to about 1,100 nm, such as from about 940 nm to about 1,070 nm, when utilized by the additive manufacturing machine 102 to melt or sinter the powder material 120 to form a three-dimensional object 114.

Regardless of whether an irradiation device 138, 140 and/or an imaging system 162 serves as the lights source 202, or whether the light source 202 is provided as a separate or additional component, the light source may be configured to provide an assessment beam 204 with a suitable optical characteristics, such as power level, wavelength, spot size, etc., for the optical element monitoring system 200 to detect one or more types of optical anomalies that may be of interest, including contaminants and/or damage. The detectability of certain contaminants and/or damage may depend at least in part on one or more optical characteristics of the assessment beam 204, such as the wavelength, spot size, power level, etc. The suitable optical characteristics may depend on the composition of the type of contaminants intended to be detected, and/or the composition of the powder material utilized by the additive manufacturing machine, which may influence the optical characteristics of the contaminants, such as the optical characteristics of dust, soot, residues from fumes or vapor, and the like. For example, certain contaminants and/or damage may reflect and/or transmit light within a certain wavelength range. As another example, the reflective properties of contaminants and/or damage may depend on the spot size of the assessment beam 204. Additionally, or in the alternative, the detectability of certain contaminants/and/or damage may depend on the power level of the assessment beam 204. For example, too high of a power level (and/or other unsuitable assessment beam characteristics) may result in an optical behavior such as widespread light scattering that may not yield suitable detection results, while on the other hand, a suitable power level (and/or other suitable assessment beam characteristics) may allow for optical anomalies to be detected with a good degree of accuracy and precision. Suitable optical characteristics of the assessment beam 204 may be selected at least in part by characterizing the type(s) of contaminants and/or damage sought to be detected, including, for example, by in situ exposure of known optical anomalies to one or more assessment beams 204 with candidate assessment beam characteristics. One or more optical characteristics of the assessment beam 204, such as wavelength, spot size, power level, etc., may be selected based at least in part on a relationship between the detectability of certain contaminants and/or damage and the one or more optical characteristics of the assessment beam 204.

Still referring to FIGS. 2A through 2F, a control system 104 and/or an optical element monitoring system 200 may include an optics module 226 and/or an irradiation module 228. The optics module 226 and/or the irradiation module 228 may be included as part of a control system 104 associated with an additive manufacturing machine 102. An optics module 226 may be configured to control one or more operations of the optical element monitoring system 200. The optics module 226 may be configured to cause the control system 104 to perform one or more control operations associated with the optical element monitoring system 200, such as operating the light source 202, the light sensor 208 and/or the scanner 210, and/or generating assessment data, and/or evaluating an optical element 206 using the assessment data. The irradiation module 228 may be configured to cause an energy beam system 134 to perform one or more operations, such as one or more irradiation operations. The one or more irradiation operations may include operations associated with irradiating sequential layers of a powder bed 136, for example, based at least in part on an input from the optics module 226. The one or more irradiation operations may be performed to additively manufacture three-dimensional objects and/or in connection with a calibration operation.

An optical element monitoring system 200 may include an optics module 226 configured to perform one or more optical element monitoring operations, including detecting optical anomalies, such as contamination and/or damage, that may be present upon any one or more optical elements 206 of an energy beam system 134 and/or an imaging system 162. An optical element monitoring operation may be performed prior to and/or concurrently with operations for additively manufacturing a three-dimensional object. Additionally, or in the alternative, an optical element monitoring operation may be performed as part of a calibration operation, such as prior to or during additively manufacturing a three-dimensional object.

An optics module 226 may be configured to perform an optical element monitoring operation that includes determining a characteristic of an optical anomaly, such as determining whether the optical anomaly includes contamination and/or damage. Additionally, or in the alternative, an optics module 226 may be configured to perform an optical element monitoring operation that includes determining a location of an optical anomaly, such as X,Y coordinates corresponding to the optical anomaly. The X,Y coordinates corresponding to the optical anomaly may include X,Y coordinates on and optical element and/or X,Y coordinates on a build plane 130. The location of an optical anomaly may be determined based at least in part on a beam incidence location 214 of an assessment beam 204 corresponding to a signal from a light sensor 208 indicative of the optical anomaly. The signal from the light sensor 208 may include data generated based at least in part on the signal from the light sensor 208.

Still referring to FIGS. 2A through 2F, an optical element monitoring system 200 may be configured to determine optical anomalies, such as contamination and/or damage, that may be present upon any one or more optical elements 206, based at least in part on the reflected beam 216. The existence of optical anomaly upon an optical element 206, a location of such an optical anomaly, and/or one or more characteristics of such an optical anomaly, may be determined based at least in part on the reflected beam 216 and/or one or more properties of the reflected beam 216. For example, an optical anomaly may be determined based at least in part on an intensity of a reflected beam 216. Additionally, or in the alternative, an optical anomaly may be determined based at least in part on a wavelength or wavelength range of the reflected beam 216. Additionally, or in the alternative, an optical anomaly may be determined based at least in part on a phase shift of the reflected beam 216, such as a phase shift associated with a particular wavelength or wavelength range of the reflected beam 216.

As another alternative, an optical anomaly may be determined based at least on a degree of focus and/or defocus of the assessment beam detected by a light sensor 208. An optical anomaly may cause a backscatter and/or forward scatter that may be detected by a light sensor 208. As used herein, the terms back scatter and forward scatter refer to optical phenomena whereby an optical anomaly, such as contamination or damage to an optical element 206, causes unfocused light to be reflected. In the case of back scatter, at least one directional component of the assessment beam 204 is reflected back in the direction from which the assessment beam 204 prior to having been reflected. In the case of forward scatter, at least one directional component of the assessment beam 204 is reflected forward in the direction of the assessment beam 204 prior to having been reflected. An optical anomaly may cause an assessment beam 204 to exhibit light scattering phenomena, such as halos, dispersion, and the like. Additionally, or in the alternative, an optical anomaly may cause an assessment beam 204 to exhibit diffraction phenomena, such as when an optical anomaly obstructs a portion of the assessment beam 204.

Optical anomaly information, such as information pertaining to an existence, location, and/or characteristic of an optical anomaly, may be determined using a Maxwell equation. For example, a Maxwell equation may be applied to assessment data obtained from a reflected portion of an assessment beam 204 detected by a light sensor 208. The Maxwell equation may be used to determine an existence, location, and/or characteristic of an optical anomaly that may cause the reflected beam 216 to be detected by a light sensor 208. Exemplary Maxwell equations may include, or may be based at least in part on, a Mie solution, a Rayleigh approximation, a Rayleigh-Gans approximation, an anomalous diffraction approximation, or the like. A Mie solution may be suitable for optical anomalies that include features that are larger than or similar to the wavelength of light reflected, such as optical anomalies that have a characteristic dimension, such as a radius, of from about 600 nanometers to about 50 micrometers, such as from about 1 micrometer to about 50 micrometers. An exemplary Mie solution may utilize discrete dipole approximation or other computational techniques. A Rayleigh approximation or a Rayleigh-Gans approximation may be suitable for optical anomalies that are optically soft, such as optical anomalies that have a refractive index close to 1. Additionally, or in the alternative, a Rayleigh approximation or a Rayleigh-Gans approximation may be suitable for optical anomalies that include relatively small features, such as features that are smaller than the wavelength of reflected light. By way of illustration, Mie-type and/or Raleigh-type scattering may be exhibited by additive manufacturing powder materials, for example, as a result of a strong contrast in refractive index between pores and solid portions of melted or sintered powder material. Additionally, or in the alternative, Mie-type and/r Raleigh-type scattering may be exhibited by dust, soot, residues from fumes or vapor, and the like that may accumulate on optical elements 206.

Additionally, or in the alternative, a macroscopic Maxwell equation may be provided based at least in part on experimentally determined parameters for a phenomenological description of the electromagnetic response of the one or more optical elements 206 and one or more exemplary optical anomalies associated therewith. Additionally, or in the alternative, a relative size of an optical anomaly may be determined based at least in part on a size parameter that depends at least in part on a ration of a characteristic dimension of the anomaly and a wavelength of light reflected by the optical anomaly. For example, a dimensionless parameter, x, that characterizes a particle interaction with incident light, such as a spherical particle, may be proportional to a ratio of the radius of the particle, r, to the wavelength, $\lambda$, of the light reflected, as follows: $x = 2\pi r/\lambda$.

An optical element monitoring system 200 may be configured to determine whether one or more optical elements 206 exhibit an optical anomaly, such as contamination and/or damage, based at least in part on a comparison of assessment data to reference data. The assessment data and/or the reference data may be determined based at least in part on a reflected beam 216. A reflected beam 216 from which assessment data is determined may be sometimes referred to as a measurement beam. A reflected beam 216 from which reference data is determined may be sometimes referred to as a reference beam. The assessment data may be provided by one or more light sensors 208 and/or the assessment data may be determined based at least in part on a signal from one or more light sensors 208. The reference data may also be provided by one or more light sensors 208 and/or may be determined based at least in part on a signal from one or more light sensors 208. Additionally, or in the alternative, the reference data may be stored as data for purposes of comparison with the assessment data. The reference data may be a threshold value. For example, an optical element monitoring system 200 may be configured to determine whether one or more optical elements 206 exhibit an optical anomaly based at least in part on a comparison of assessment data to a threshold value.

Assessment data and/or reference data from one or more light sensors 208 may be utilized by an optical element monitoring system to determine optical anomalies using any one or more of the techniques disclosed herein. Assessment data and/or reference data may be indicative of one or more optical properties of the reflected beam 216 (e.g., intensity, wavelength, phase shift, focus/defocus, backscatter/forward scatter, light scattering phenomena, diffraction phenomena, etc.). Additionally, or in the alternative, one or more optical properties may be determined from the assessment data and/or the reference data. A Maxwell equation may be utilized to compare assessment data to reference data. Additionally, or in the alternative, assessment data may be compared to reference data without reliance on a Maxwell equation. Assessment data may include a signal from one or more light sensors 208 and/or may be based at least in part on a signal from one or more light sensors 208. Additionally, or in the alternative, reference data may include a signal from one or more light sensors 208 and/or may be based at least in part on a signal from one or more light sensors 208.

Still referring to FIGS. 2A-2F, a reference beam and an assessment beam may be detected contemporaneously, and/or the reference beam and the assessment beam may be detected a separate discrete points in time. Reference data may be determined based at least in part on a reflected beam 216 detected by one or more light sensors 208 when propagating from a first location of the one or more optical elements 206 at a first time. Additionally, or in the alternative, assessment data may be determined based at least in part on a reflected beam 216 detected by the one or more light sensors 208 when propagating from a second location of the one or more optical elements at the first time or a second time, and/or when propagating from the first location of the one or more optical elements 206 at a second time. The first and second locations may include a region of an optical element and/or a beam incidence location.

As an example of a reference beam and an assessment beam being detected contemporaneously, as shown in FIGS. 2A-2F, at least a portion of an assessment beam 204 may pass through a proximal surface 218 an optical element 206 and a distal surface 220 of the optical element 206. A first portion of the assessment beam 204 may be reflected, transmitted, and/or refracted by the proximal surface 218 of the optical element 206, providing a first reflected beam 216 that may serve as a reference beam. A second portion of the assessment beam 204 may be reflected, transmitted, and/or refracted by the distal surface 220 of the optical element 206, providing a second reflected beam 216 that may serve as a measurement beam. When the assessment beam 204 becomes incident upon the optical element 206 with an angle of incidence, the beam incidence location corresponding to the proximal surface 218 (e.g., the X,Y coordinates) may differ from the beam incidence location corresponding to the distal surface 220 (e.g., the X,Y coordinates).

Additionally, or in the alternative, as another example, as shown in FIGS. 2E and 2F, at least a portion of an assessment beam 204 may pass through a proximal optical element 222 and a distal optical element 224. A first portion of the assessment beam 204 may be reflected, transmitted, and/or refracted by the proximal optical element 222, providing a first reflected beam 216 that may serve as a reference beam. A second portion of the assessment beam 204 may be reflected, transmitted, and/or refracted by the distal optical element 224, providing a second reflected beam 216 that may serve as a measurement beam. When the assessment beam 204 becomes incident upon the proximal optical element 222 and the distal optical element 224 with an angle of incidence, the beam incidence location corresponding to the proximal optical element 222 (e.g., the X,Y coordinates) may differ from the beam incidence location corresponding to the distal optical element 224 (e.g., the X,Y coordinates).

The first location may correspond to the reference beam propagating from a first surface of the first optical element 206. Additionally, or in the alternative, the second location may correspond to the measurement beam propagating from a second surface of the first optical element 206. The first surface may be a proximal surface of the first optical element 206 and the second surface may be a distal surface of the first optical element 206, or vice versa. By way of example, as shown in FIGS. 2A-2F, one or more light sensors may detect a reflected beam 216 propagating from a proximal surface 218 of an optical element 206, such as from a first location of the proximal surface 218 of the optical element 206. The reflected beam 216 propagating from the proximal surface 218 of the optical element 206 may serve as a reference beam. The control system 104 may determine reference data based at least in part on an input from the one or more light sensors 208 corresponding to the reflected beam 216 propagating from the proximal surface 218 of the optical element 206. Additionally, or in the alternative, one or more light sensors 208 may detect a reflected beam 216 from a distal surface 220 of an optical element 206, such as from a second location of the distal surface 220 of the optical element 206. The reflected beam 216 propagating from the distal surface 220 of the optical element 206 may serve as the measurement beam. The control system 104 may determine assessment data based at least in part on an input from the one or more light sensors 208 corresponding to the reflected beam 216 propagating from the distal surface 220 of the optical element 206 (e.g., the measurement beam).

Additionally, or in the alternative, the first location may correspond to the reference beam propagating from a first optical element 206. Additionally, or in the alternative, the second location may correspond to the measurement beam propagating from a second optical element 206. The first optical element 206 may be a distal optical element 224 and the second optical element may be a proximal optical element 222, or vice versa. By way of example, as shown in FIGS. 2E and 2F, one or more light sensors 208 (e.g., a first light sensor 208a in FIG. 2F) may detect a reflected beam 216 propagating from a proximal optical element 222, such as from a first location of the proximal optical element 222. The reflected beam 216 propagating from the proximal optical element 222 may serve as a reference beam. The first optical element 206 may be a first window, and/or the second optical element 206 may be a second window, such as a protective glass, that separates one or more components of the energy beam system 134 from a process chamber 137 within which powder material is irradiated by one or more energy beams 142, 148 to additively manufacture a three-dimensional object 114. Additionally, or in the alternative, the first optical element 206 may be a first lens, and/or the second optical element 206 may be a second lens, such as a lens configured to focus and/or direct an energy beam 142, 148 onto a build plane 130 and/or an imaging beam to a detection device of an imaging system 162. As another alternative, the first optical element 206 may be a lens, and the second optical element 206 may be a window.

The one or more light sensors 208 (e.g., a first light sensor 208a in FIG. 2F) may detect a reflected beam 216 transmitting through at least a portion of the respective optical element 206. The reflected beam 216 may reflect between the proximal surface 218 and the distal surface 220 of the optical element 206. For example, as shown in FIG. 2F, a light sensor 208 may be configured to detect a reflected beam 216 that transmits radially through the optical element 206. The light sensor 208 may be configured to detect the reflected beam 216 at a perimeter edge of the optical element 206, such as at a circumferential edge of the optical element 206. A light sensor 208, such as a first light sensor 208a, may detect a first reflected beam 216 transmitting through a first optical element 206, such as a proximal optical element 222. The first reflected beam 216 may be utilized as a reflected beam 216. The first optical element 206 may be a window or a lens. Additionally, or in the alternative, a light sensor, such as a second light sensor 208b, may detect a second reflected beam 216 transmitting through a second optical element 206, such as a distal optical element 224. The second reflected beam 216 may be utilized as an assessment beam. The second optical element 206 may be a window or a lens.

An assessment beam 204 may be partially refracted by a first surface, such as a proximal surface 218, of the first optical element 206 at a first location, providing a first reflected beam 216 that transmits through the first optical element 206 to a light sensor 208, such as a first light sensor 208a. Additionally, or in the alternative, the first reflected beam 216 may be provided by the assessment beam 204 being partially reflected by a second surface, such as a distal surface 220, of the first optical element 206, with the first reflected beam 216 being transmitted through the optical element 206 to the light sensor 208, such as the first light sensor 208a. At least a portion of the assessment beam 204 may propagate through the first optical element 206, such as proximal optical element 222, to the second optical element 206, such as a distal optical element 224. At least a portion of the assessment beam 204 incident upon the second optical element 206 may be partially refracted by a first surface, such as a proximal surface 218, of the second optical element 206 at a second location, providing a second reflected beam 216 that transmits through the second optical element 206 to a light sensor 208, such as a second light sensor 208b. Additionally, or in the alternative, the second reflected beam 216 may be provided by the assessment beam 204 being partially reflected by a second surface, such as a distal surface 220, of the second optical element 206, with the second reflected beam 216 being transmitted through the optical element 206 to the light sensor 208, such as a second light sensor 208b. The first reflected beam 216 may be incident upon a light sensor 208, such as a first light sensor 208a, at a first time, and the second reflected beam 216 may be incident upon a light sensor 208, such as a second light sensor 208b at a second time. The first reflected beam 216 may propagated from a first location, for example, having first X,Y coordinates, and the second reflected beam may propagate from a second location, for example, having second X,Y coordinates. The X,Y coordinates of the first location may be the same or different than the X,Y coordinates of the second location. For example, when an assessment beam 204 is normal to the first and second optical elements 206, the first and second reflected beams 216 may have the same X,Y coordinates. Additionally, or in the alternative, when an assessment beam is oblique to the first and second optical elements 206, the first and second reflected beams 216 may have differing X,Y coordinates.

The first optical element 206 and the second optical element 206 may be associated with the same optical assembly 135. Alternatively, the first optical element 206 may be associated with a first optical assembly 135 and the second optical element 206 may be associated with a second optical assembly 135. Additionally, or in the alternative, the first optical element 206 and the second optical element 206 may be associate with the same irradiation device 138, 140, or separate irradiation devices 138, 140. For example, the first optical element 206 may be associated with a first irradiation device 138 and the second optical element 206 may be associate with a second irradiation device 140. As another alternative, the first optical element 206 and the second optical element 206 may be associate with the same imaging system 162, or separate imaging systems 162.

The control system 104 may determine reference data based at least in part on an input from the one or more light sensors 208 (e.g., the first light sensor 208a in FIG. 2F) corresponding to the reflected beam 216 propagating from the proximal optical element 222 (e.g., the reference beam). Additionally, or in the alternative, one or more light sensors 208 (e.g., a second light sensor 208b in FIG. 2F) may detect a reflected beam 216 from a distal optical element 224, such as a second location of the distal optical element 224. The reflected beam 216 propagating from the distal optical element 224 may serve as the measurement beam. The control system 104 may determine assessment data based at least in part on an input from the one or more light sensors 208 (e.g., the second light sensor 208b in FIG. 2F) corresponding to the reflected beam 216 propagating from the distal optical element 224 (e.g., the measurement beam).

The control system 104 may be configured to determine the first location based at least in part on a scanner position corresponding to the reference beam detected by the one or more light sensors 208 to provide the reference data. The control system 104 may be configured to determine the second location based at least in part on a scanner position corresponding to the assessment beam detected by the one or more light sensors 208 to provide the assessment data. Even when the reference beam and the measurement beam may become incident upon the one or more light sensors 208 contemporaneously, the control system 104 may be configured to differentiate the reference beam and the measurement beam. For example, the reference beam and the measurement beam may be differentiated based at least in part on time of flight, a location where the respective beams become incident upon the one or more light sensors 208, and/or one or more properties of the respective beams.

The reference beam and the measurement beam may be differentiated based at least in part on time of flight given that the measurement beam travels a different distance than the reference beam. Additionally, or in the alternative, the reference beam and the measurement beam may be determined at different points in time. For example, a reference beam may be determined at a previous time and stored in memory for future comparison with a measurement beam. In addition, or in the alternative to time of flight, the reference beam and the measurement beam may be differentiated based at least in part on a location of the one or more light sensors 208 upon which the reference beam and the measurement beam respectively. For example, a when the reference beam and the measurement beam propagate from a different location, the reference beam and the measurement beam may be detected by a correspondingly different portion of the one or more light sensors 208. For example, the reference beam and the measurement beam may be detected by respectively different pixels of the one or more light sensors 208. Additionally, or in the alternative, the reference beam and the measurement beam may be detected by different respective ones of the one or more light sensors 208. A clock time of the light sensor 208 may be synchronized with a clock time of the scanner 210. Such synchronization may allow the control system 104 to determine a beam incidence location and/or for the control system 104 to differentiate between a measurement beam and a reference beam.

An optical element monitoring system 200 may be configured to compare a distal surface 220 of an optical element to a proximal surface 218 of an optical element 206. Additionally, or in the alternative, optical element monitoring system 200 may be configured to compare a distal optical element 224 to a proximal optical element 222. A reflected beam 216 propagating from a proximal surface 218 may be utilized as a reference beam, and a reflected beam 216 propagating from a distal surface 220 may be utilized as a measurement beam. For example, because the distal surface 220 faces the process chamber 137, the distal surface 220 may be more prone to optical anomalies. However, a proximal surface 218 may also incur optical anomalies. Thus, a reflected beam 216 propagating from a proximal surface 218 may be utilized as a measurement beam, and a reflected beam 216 propagating from a distal surface 220 may be utilized as a reference beam. Additionally, or in the alternative, a reflected beam 216 propagating from a proximal optical element 222 may be utilized as a reference beam, and a reflected beam 216 propagating from a distal optical element 224 may be utilized as a measurement beam. For example, because the distal optical element 224 is closer to the process chamber 137, the distal optical element 224 may be more prone to optical anomalies. However, a proximal optical element 222 may also incur optical anomalies. Thus, a reflected beam 216 propagating from a proximal optical element 222 may be utilized as a measurement beam, and a reflected beam 216 propagating from a distal optical element 224 may be utilized as a reference beam.

An optical element monitoring system 200 may be configured to differentiate and/or alternate between whether the reference beam and the measurement beam respectively correspond to the proximal surface 218 or the distal surface 220, and/or whether the reference beam and the measurement beam respectively correspond to the proximal optical element 222 or the distal optical element 224. Whether reflected beam 216 is utilized as a reference beam or a measurement beam may depend on data from the one or more light sensors 208 upon having detected the reflected beam 216. For example, a reflected beam 216 propagating from a proximal optical element 222 may be compared to a reflected beam 216 propagating from a distal optical element 224. Additionally, or in the alternative, a reflected beam 216 propagating from a proximal surface 218 of an optical element 206 may be compared to a reflected beam 216 propagating from a distal surface of the optical element 206. Whether an optical element 206 exhibits an optical anomaly may be determined based at least in part on the comparison between the respective reflected beams 216.

A control system 104 may be configured to determine whether an optical anomaly exists on a first surface or a second surface of an optical element 206, and/or whether an optical anomaly exists on a first optical element 206 or a second optical element 206. For example, the control system 104 may be configured to determine whether one or more optical elements 206 exhibit an optical anomaly based at least in part on a comparison of a first reflected beam 216 to a second reflected beam 216. The first reflected beam 216 may be detected by the one or more light sensors 208 when propagating from a first location of the one or more optical elements 206, and the second reflected beam may be detected by the one or more light sensors 208 when propagating from a second location of the one or more optical elements 206. The control system 104 may be configured to determine whether one or more optical elements 206 exhibit an optical anomaly based at least in part on data from the one or more light sensors 208 indicating a difference between the first reflected beam 216 and the second reflected beam 216, such as a difference that exceeds a threshold value. The control system 104 may be configured to determine that the first surface exhibits an optical anomaly based at least in part on data from the one or more light sensors 208 indicating a first value corresponding to the first reflected beam 216 exceeding a second value corresponding to the second reflected beam 216, such as the first value exceeding the second value by at least a threshold value. The data from the one or more light sensors 208 may include subsequent data generated based at least in part on the data from the one or more light sensors 208.

Reference data may accumulate over time, for example, over multiple measurement iterations, and/or as a scanner 210 orients and/or scans an assessment beam 204 to various portions of the scan filed 212. Assessment data may be converted to reference data when the assessment data is below a threshold indicating an absence of an optical anomaly. Whether an optical element 206 exhibits an optical anomaly may be determined based at least in part on a comparison of assessment data to a threshold value. The comparison may be performed with reference to an absolute difference, a step change, a trend, or the like.

Referring now to FIGS. 3A-3D, an optical element monitoring system 200 may include an optical assembly 135 that has one or more optical elements 206 and a plurality of light sensors 208 distributed about a perimeter, such as a circumferential perimeter, of respective ones of the one or more optical elements 206. The plurality of light sensors 208 may be configured to detect a reflected beam 216 at a perimeter edge of the optical element 206, such as at a circumferential edge of the optical element 206. A reflected beam 216 may be detected by one or more of the plurality of light sensors 208. All or a portion of the plurality of light sensors 208 may detect a reflected beam 216 under various conditions. Whether one or more optical elements exhibit an optical anomaly may be determined based at least in part on a comparison of assessment data corresponding to one or more of the plurality of light sensors 208 distributed about a perimeter of an optical element 206.

Whether a reflected beam 216 becomes incident upon a given light sensor 208 from among the plurality of light sensors 208 may depend on the beam incidence location 214 corresponding to the assessment beam 204 from which the reflected beam 216 propagates. Additionally, or in the alternative, whether a reflected beam 216 becomes incident upon a given light sensor 208 may depend on the presence or absence of an optical anomaly. One or more of the plurality of light sensors 208 may detect a reflected beam 216 only in the event of an optical anomaly. For example, the optical anomaly may cause a reflected beam 216 to be directed to one or more light sensors 208. A reflected beam 216 detected by the one or more light sensors 208 may be indicative of an optical anomaly. Alternatively, one or more of the plurality of light sensors 208 may be configured to detect a reflected beam 216 in the absence of an optical anomaly. One or more properties of the reflected beam 216 may be augmented by an optical anomaly, such that a change in one or more properties of the reflected beam 216 detected by one or more light sensors 208 may be indicative of an optical anomaly.

Figure 3A:
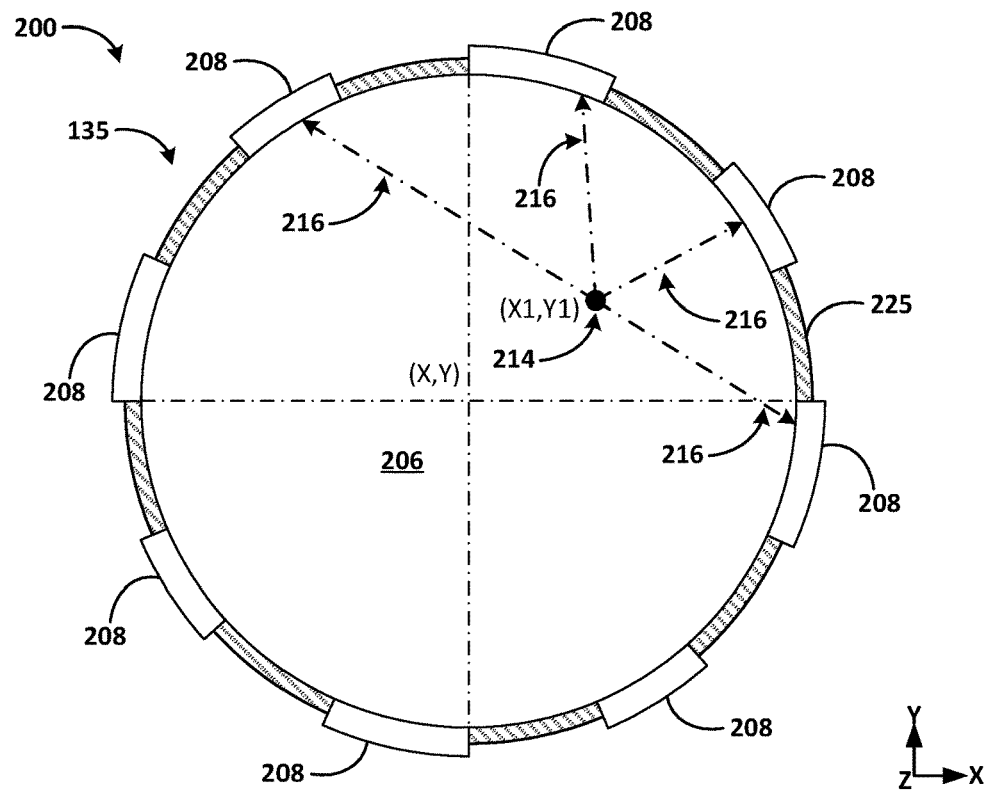
FIGS. 3A-3D schematically depict perspective views of exemplary optical element assemblies.
Figure 3B:
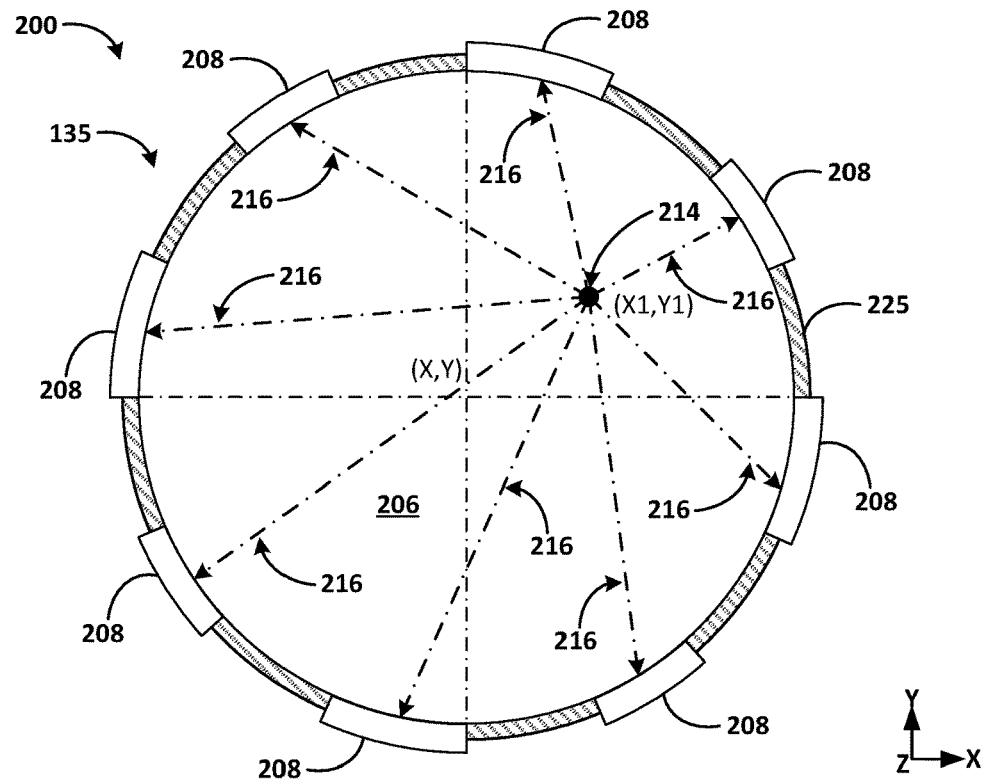

By way of example, as shown in FIG. 3A, a reflected beam 216 may become incident upon a first set of the plurality of light sensors 208 distributed about a perimeter of an optical element 206. The reflected beams 216 shown in FIG. 3A may represent nominal conditions, such as an absence of an optical anomaly corresponding to the beam incidence location at X1,Y1. As shown for example in FIG. 3B, a reflected beam 216 may become incident upon a second set of the plurality of light sensors 208 distributed about a perimeter of an optical element 206. The reflected beams 216 shown in FIG. 3B may represent abnormal conditions, such as an optical anomaly corresponding to the beam incidence location at X1,Y1. For example, in the absence of an optical anomaly corresponding to the beam incidence location 214, a reflected beam 216 may propagate from the beam incidence location 214 to one or more light sensors 208 in proximity to the beam incidence location 214. Additionally, or in the alternative, in the event of an optical anomaly, a reflected beam may propagate from the beam incidence location to one or more light sensors 208 that differ from the set of light sensors 208 that detect a reflected beam in the absence of an optical anomaly corresponding to the beam incidence location 214. Whether one or more optical elements 206 exhibit an optical anomaly may be determined based at least in part on whether one or more light sensors 208 detect a reflected beam 216 and/or based at least in part on which of light sensors 208 detect a reflected beam 216.

One or more properties of a reflected beam 216 detected by respective ones of the plurality of light sensors 208 may depend upon whether the beam incidence location 214 corresponds to an optical anomaly exhibited by one or more optical elements 206. For example, an optical anomaly may augment and/or enhance one or more properties of a reflected beam 216. An optical anomaly may cause an increased proportion of the assessment beam 204 to be reflected and/or a decreased proportion of the assessment beam 204 to be reflected. Additionally, or in the alternative the optical anomaly may change the trajectory of a reflected beam 216.

Respective ones of the plurality of light sensors 208 may detect a different amount of reflected light depending on a location of beam on the optical element 206. An intensity of light detected at one or more of the light sensors may change when there is an optical anomaly. Whether an optical element 206 exhibits an optical anomaly may be determined by comparison to nominal conditions. In the event of an optical anomaly, one or more of the light sensors 208 may detect a reflected beam 216 when a reflected beam 216 is not expected, and/or a light sensor 208 may detect a reflected beam 216 that has a higher than expected intensity. For example, an optical anomaly may cause a reflected beam to become incident upon a light sensor 208. Additionally, or in the alternative, in the event of an optical anomaly, one or more light sensors 208 may detect an absence of a reflected beam 216 when a reflected beam 216 is expected, and/or a light sensor 208 may detect a reflected beam 216 that has a lower than expected intensity. For example, an optical anomaly may at least partially interfere with a reflected beam 216 from becoming incident upon a light sensor 208.

Figure 3C:
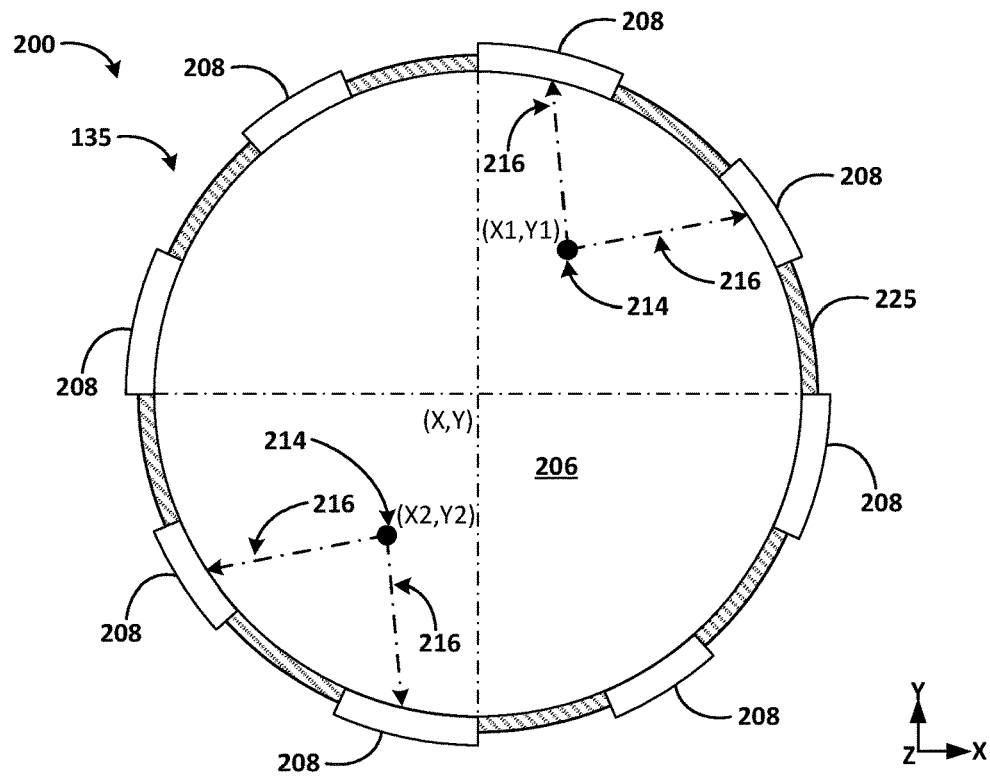
Figure 3D:
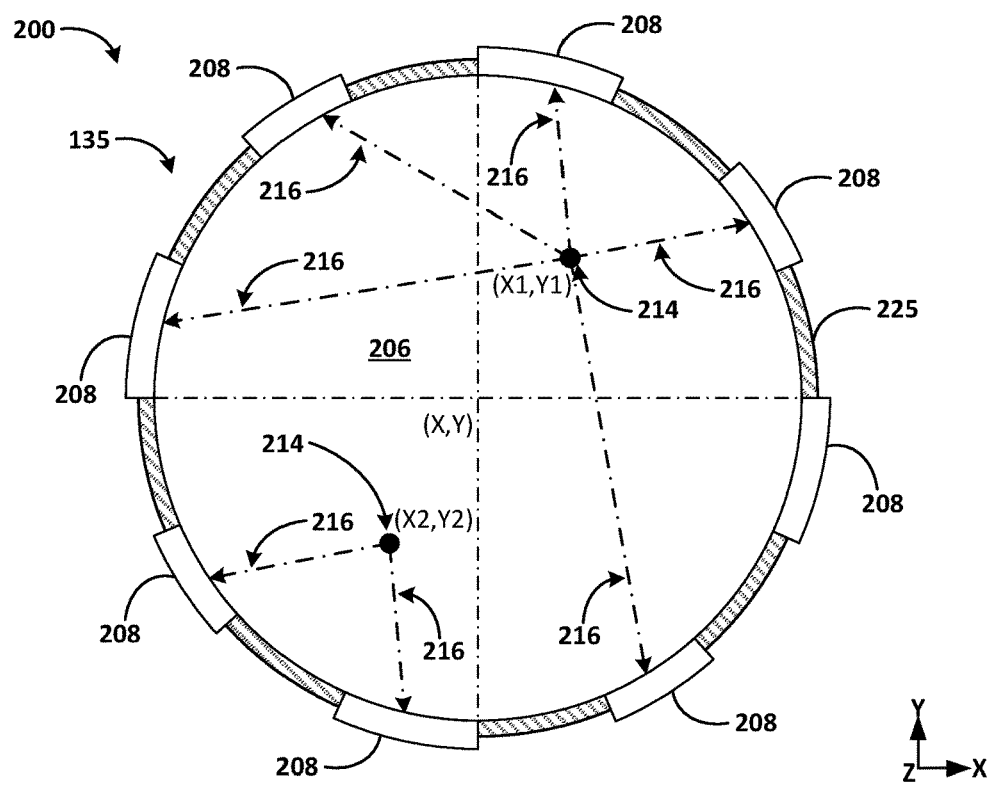

Referring to FIGS. 3C and 3D, whether one or more optical elements 206 exhibit an optical anomaly may be determined based at least in part on assessment data corresponding to reflected beams 216 detected when an assessment beam 204 is directed to respective ones of a plurality of beam incidence locations 214. For example, assessment data from one or more light sensors 208 corresponding to a first beam incidence location 214 may be compared to assessment data from one or more light sensors 208 corresponding to a second beam incidence location 214. By way of example, as shown in FIGS. 3C and 3D, the first beam incidence location 214 and the second beam incidence location 214 may be in opposite regions of the optical element. The first beam incidence location 214 may have coordinates X1,Y1 and the second beam incidence location 214 may have coordinates X2,Y2. The coordinates X1,Y1 and X2,Y2 may be inverse coordinates of one another.

As illustrated by FIG. 3C, in the absence of an optical anomaly corresponding to the first beam incidence location and the second beam incidence location, first assessment data associated with one or more light sensors 208 corresponding to the first beam incidence location 214 may accord to second assessment data associated with one or more light sensors 208 corresponding to the second beam incidence location 214. For example, the first assessment data and the second assessment data may exhibit respective values that accord to one another, such as within a defined range or threshold. Additionally, or in the alternative, a first set of light sensors 208 that detect a reflected beam 216 corresponding to the first beam incidence location 214 may accord to a second set of light sensors 208 that detect a reflected beam 216 corresponding to the second beam incidence location 214. For example, the first set of light sensors 208 may fall within a first chord and the second set of light sensors 208 may fall within a second chord. The first chord and the second chord may be inverse to one another.

As illustrated in FIG. 3D, in the event of an optical anomaly corresponding to the first beam incidence location, first assessment data associated with one or more light sensors 208 corresponding to the first beam incidence location 214 may differ from second assessment data associated with one or more light sensors 208 corresponding to the second beam incidence location 214. For example, the first assessment data the second assessment data may exhibit values that deviate from one another, such as with respect to a defined range or threshold. Additionally, or in the alternative, a first set of light sensors 208 that detect a reflected beam 216 corresponding to the first beam incidence location 214 may differ from to a second set of light sensors 208 that detect a reflected beam 216 corresponding to the second beam incidence location 214. For example, the first set of light sensors 208 may fall within a first chord and the second set of light sensors 208 may fall within a second chord. The first chord and the second chord may differ from one another. The first set of light sensors 208 may include a greater number of light sensors 208 and/or the first chord may be larger than the second chord.

Figure 4A:
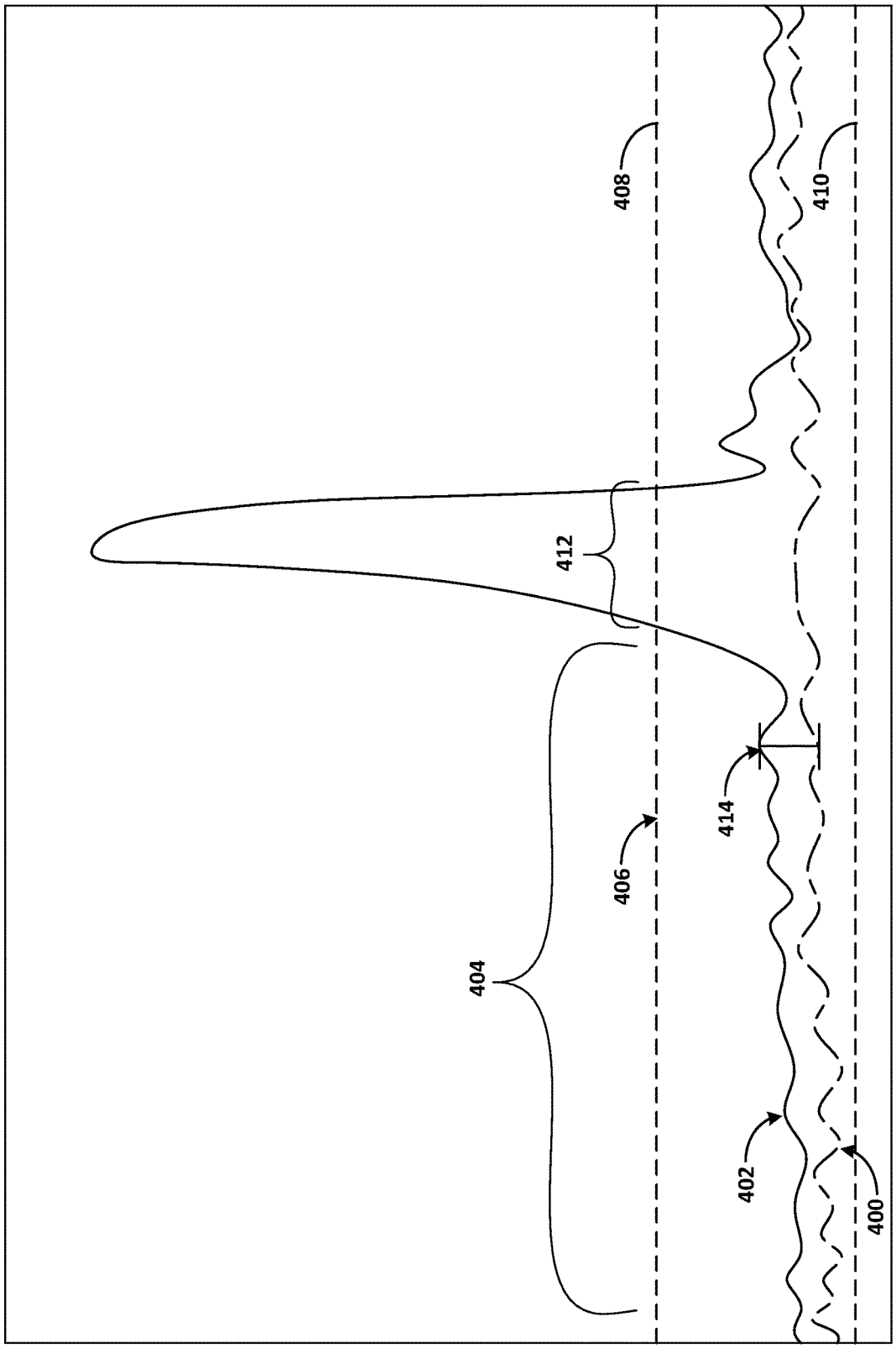
FIGS. 4A and 4B schematically depict exemplary light sensor values that may be utilized to determine an optical anomaly upon one or more optical elements.
Figure 4B:
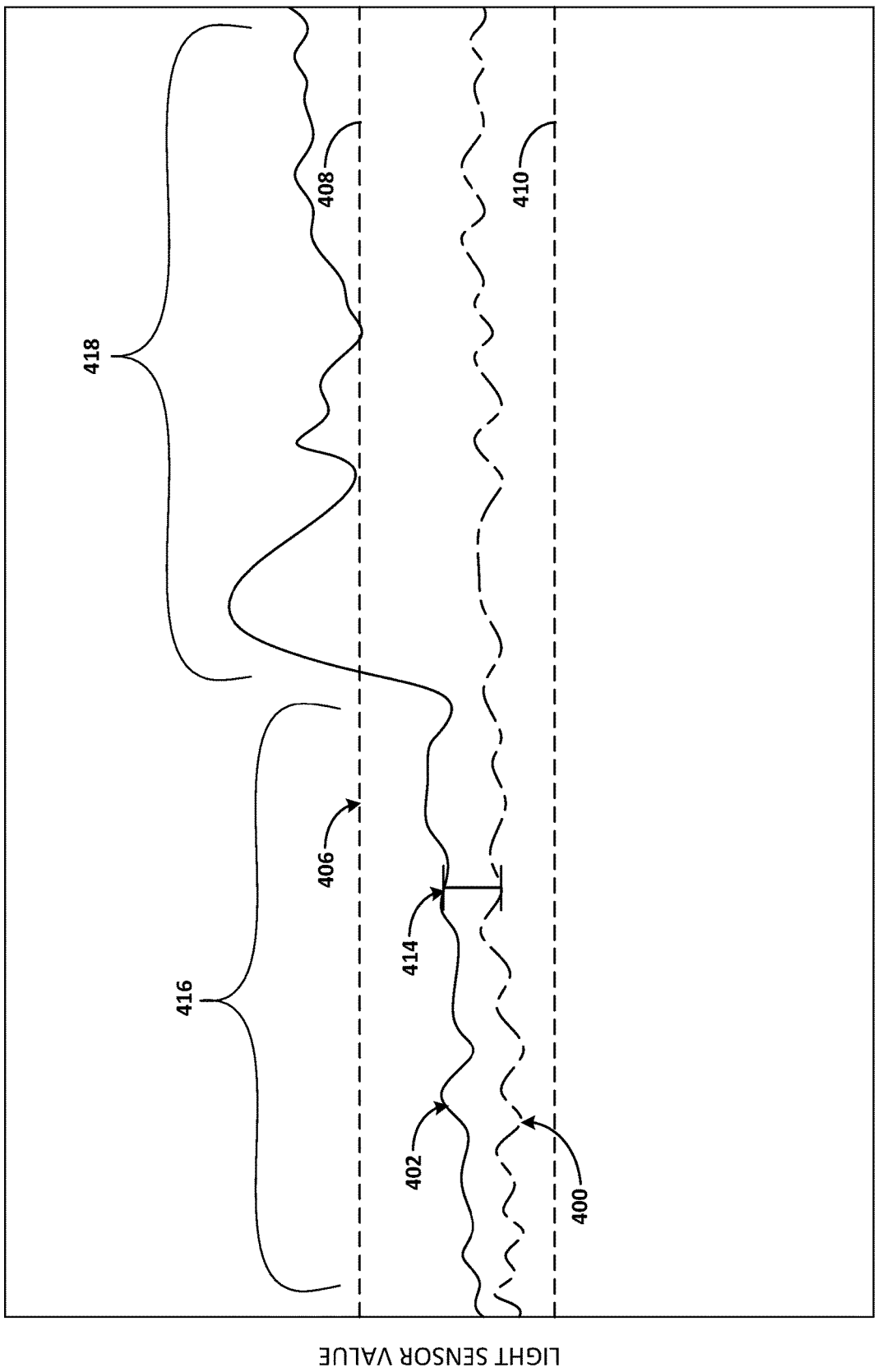

Referring now to FIGS. 4A and 4B, exemplary assessment data will be described. Assessment data may include light sensor values determined as a function of beam position and/or as a function of time. The light sensor values may be indicative of one or more optical properties of a reflected beam 216 (e.g., intensity, wavelength, phase shift, focus/ defocus, backscatter/forward scatter, light scattering phenomena, diffraction phenomena, etc.). By way of illustration, FIG. 4A shows exemplary light sensor values determined as a function of beam position, and FIG. 4B shows exemplary light sensor values determined as a function of time. Assessment data may include a first light sensor value 400 and/or a second light sensor value 402. The first light sensor values 400 may be utilized as reference data and the second light sensor values 402 may be utilized as assessment data. The first light sensor value 400 and/or the second light sensor value 402 may respectively represent an individual value or a set of values. The first light sensor value 400 may correspond to a first one or more light sensors 208. The second light sensor values 402 may correspond to a second one or more light sensors 208. The individual value may correspond to an individual beam position, such as a beam incidence location 214. The set of values may correspond to a plurality of values for an individual beam position, or a plurality of values corresponding to a plurality of beam positions, such as a plurality of beam incidence locations 214. The first light sensor value 400 may be compared to the second light sensor value 402. Additionally, or in the alternative, the first light sensor value 400 and/or the second light sensor value 402 may be compared to a threshold value or a range.

As illustrated in FIG. 4A, light sensor values may be compared with respect to one or more beam positions. As shown, the first light sensor values 400 and/or the second light sensor values 402 corresponding to a first one or more beam positions 404 may fall within a range 406. The range 406 may be defined by an upper threshold 408 and/or a lower threshold 410. The second light sensor values 402 may fall outside the range 406 with respect to a second one or more beam positions 412. For example, the second light sensor values 402 corresponding to the second one or more beam positions 412 may exceed the upper threshold 408. Additionally, or in the alternative, a difference between the first light sensor values 400 and the second light sensor values 402 may fall within a relative range 414 with respect to the first one or more beam positions 404, and/or the difference may exceed the relative range 414 with respect to the second one or more beam positions 412.

An absence of an optical anomaly with respect to the first one or more beam positions 404 may be determined based at least in part on the first light sensor values 400 and/or the second light sensor values 402 being within the range 406. Additionally, or in the alternative, an absence of an optical anomaly with respect to the first one or more beam positions 404 may be determined based at least in part on a difference between the first light sensor values 400 and the second light sensor values 402 being within the relative range 414. An optical anomaly associated with the second light sensor values 402 may be determined with respect to the second one or more beam positions 412 based at least in part on the second light sensor values 402 being outside of the range 406. Additionally, or in the alternative, an optical anomaly with respect to the second one or more beam positions 412 may be determined based at least in part on a difference between the first light sensor values 400 and the second light sensor values 402 exceeding the relative range 414.

The first light sensor values 400 may correspond to a first optical element 206, such as a proximal optical element 222, and the second light sensor values 402 may correspond to a second optical element 206, such as a distal optical element 224. In that instance, the light sensor values illustrated in FIG. 4A may be indicative of the second optical element (e.g., the distal optical element 224) having an optical anomaly with respect to the second one or more beam positions 412. As another alternative, the first light sensor values 400 may correspond to a first surface of an optical element 206, such as a proximal surface 218, and the second light sensor values 402 may correspond to a second surface of the optical element 206, such as a distal surface 220. In that instance, the light sensor values illustrated in FIG. 4A may be indicative of the second surface of the optical element (e.g., the distal surface 220) having an optical anomaly with respect to the second one or more beam positions 412. As another alternative, the first light sensor values 400 may correspond to data for an optical element 206 determined at a first time, and the second light sensor values 402 may correspond to data for the optical element 206 determined at a second time. In that instance, the light sensor values illustrated in FIG. 4A may be indicative of the optical element having acquired an optical anomaly with respect to the second one or more beam positions 412 at a time after the first time and before the second time.

Referring now to FIG. 4B, in addition, or in the alternative to comparing light sensor values with respect to one or more beam positions, as illustrated in FIG. 4B, light sensor values may be compared over a period of time. As shown, the first light sensor values 400 and/or the second light sensor values 402 may fall within a range 406 over a first period of time 416, such as a range 406 defined by an upper threshold 408 and/or a lower threshold 410. The second light sensor values 402 may fall outside the range 406 with respect to a second period of time 418. For example, the second light sensor values 402 corresponding to the second period of time 418 may exceed the upper threshold 408. Additionally, or in the alternative, a difference between the first light sensor values 400 and the second light sensor values 402 may fall within a relative range 414 with respect to the first period of time 416, and/or the difference may exceed the relative range 414 with respect to the second period of time 418.

An absence of an optical anomaly with respect to the first period of time 416 may be determined based at least in part on the first light sensor values 400 and/or the second light sensor values 402 being within the range 406. Additionally, or in the alternative, an absence of an optical anomaly with respect to the first period of time 416 may be determined based at least in part on a difference between the first light sensor values 400 and the second light sensor values 402 being within the relative range 414. An optical anomaly associated with the second light sensor values 402 may be determined with respect to the second period of time 418 based at least in part on the second light sensor values 402 being outside of the range 406. Additionally, or in the alternative, an optical anomaly with respect to the second period of time 418 may be determined based at least in part on a difference between the first light sensor values 400 and the second light sensor values 402 exceeding the relative range 414.

The first light sensor values 400 may correspond to a first optical element 206, such as a proximal optical element 222, and the second light sensor values 402 may correspond to a second optical element 206, such as a distal optical element 224. In that instance, the light sensor values illustrated in FIG. 4A may be indicative of the second optical element (e.g., the distal optical element 224) having an optical anomaly with respect to the second one or more beam positions 412. Additionally, or in the alternative, the light sensor values illustrated in FIG. 4B may be indicative of the second optical element (e.g., the distal optical element 224) having an optical anomaly with respect to the second period of time 418. As another alternative, the first light sensor values 400 may correspond to a first surface of an optical element 206, such as a proximal surface 218, and the second light sensor values 402 may correspond to a second surface of the optical element 206, such as a distal surface 220. In that instance, the light sensor values illustrated in FIG. 4A may be indicative of the second surface of the optical element (e.g., the distal surface 220) having an optical anomaly with respect to the second one or more beam positions 412. Additionally, or in the alternative, the light sensor values illustrated in FIG. 4B may be indicative of the second surface of the optical element (e.g., the distal surface 220) having an optical anomaly with respect to the second period of time 418. Additionally, or in the alternative, for the light sensor values illustrated in FIG. A, the first light sensor values 400 may correspond to data for an optical element 206 determined at a first time, and the second light sensor values 402 may correspond to data for the optical element 206 determined at a second time. In that instance, the light sensor values illustrated in FIG. 4A may be indicative of the optical element having acquired an optical anomaly with respect to the second one or more beam positions 412 at a time after the first time and before the second time.

Figure 5A:
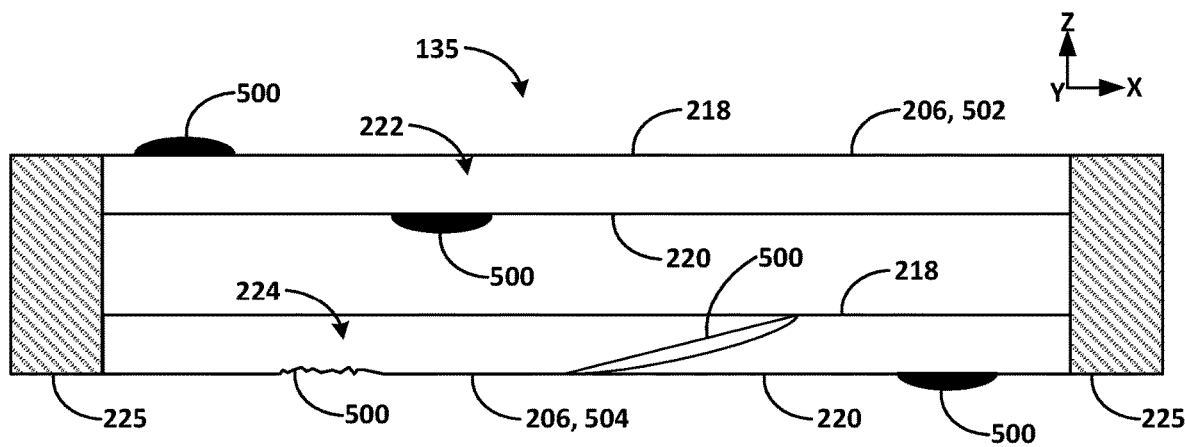
FIG. 5A schematically depicts a cross-sectional view of an exemplary optical element assembly that has optical anomalies.

Now turning to FIGS. 5A and 5B, exemplary optical anomalies 500 will be described. As shown in FIG. 5A, an optical assembly 135 may include a plurality of optical elements 206, such as a first lens 502 and a second lens 504. The optical assembly 135 and/or the plurality of optical elements 206 may be supported by one or more frames 225. For example, the one or more frames 225 may support the first lens 502 and/or the second lens 504. Exemplary optical anomalies 500 that may be detected by an optical element monitoring system 200 include contamination and/or damage. For example, contaminants associated with the additive manufacturing process, such as powder material, dust, soot, residues from fumes or vapor, and the like may become deposited on the one or more optical elements 206. Additionally, or on the alternative, the one or more optical elements 206 may exhibit damage such as cracks, scratches, pitting, and the like.

Optical anomalies 500 may be located on an external optical element 206, such as an optical element 206 that is exposed to the process chamber 137 of an additive manufacturing machine 102. For example, powder material, dust, soot, residues from fumes or vapor, and the like may become deposited on a window or protective glass that separates one or more components of the energy beam system 134 from conditions existing within a process chamber 137 of an additive manufacturing machine 102. Additionally, or in the alternative, optical anomalies 500 may be located on an internal optical element 206, such as an optical element housed within a frame 225 of an energy beam system 134 and/or a frame 225 of an imaging system 162. For example, powder material, dust, soot, residues from fumes or vapor, and the like may propagate into spaces between optical elements 206 and become deposited on internal surfaces of such optical elements 206.

Contaminants may cause damage to optical elements 206, such as pitting and/or cracks. For example, contaminants that have deposited on an optical element 206 may be heated by an energy beam 142, 148, thereby damaging the optical element 206. The location of such optical anomalies may be determined by an optical element monitoring system 200. For example, an optical element monitoring system 200 may be configured to determine an optical element 206 that exhibits an optical anomaly 500 from among a plurality of optical elements 206. Additionally, or in the alternative, the optical element monitoring system 200 may be configured to determine a location of an optical anomaly 500 on an optical element 206. For example, the optical element monitoring system 200 may be configured to determine whether the optical anomaly is located on an external surface, an internal surface, or within an internal material of an optical element 206. Additionally, or in the alternative, the optical element monitoring system 200 may be configured to determine X, Y, and/or Z coordinates of an optical anomaly 500.

Figure 5B:
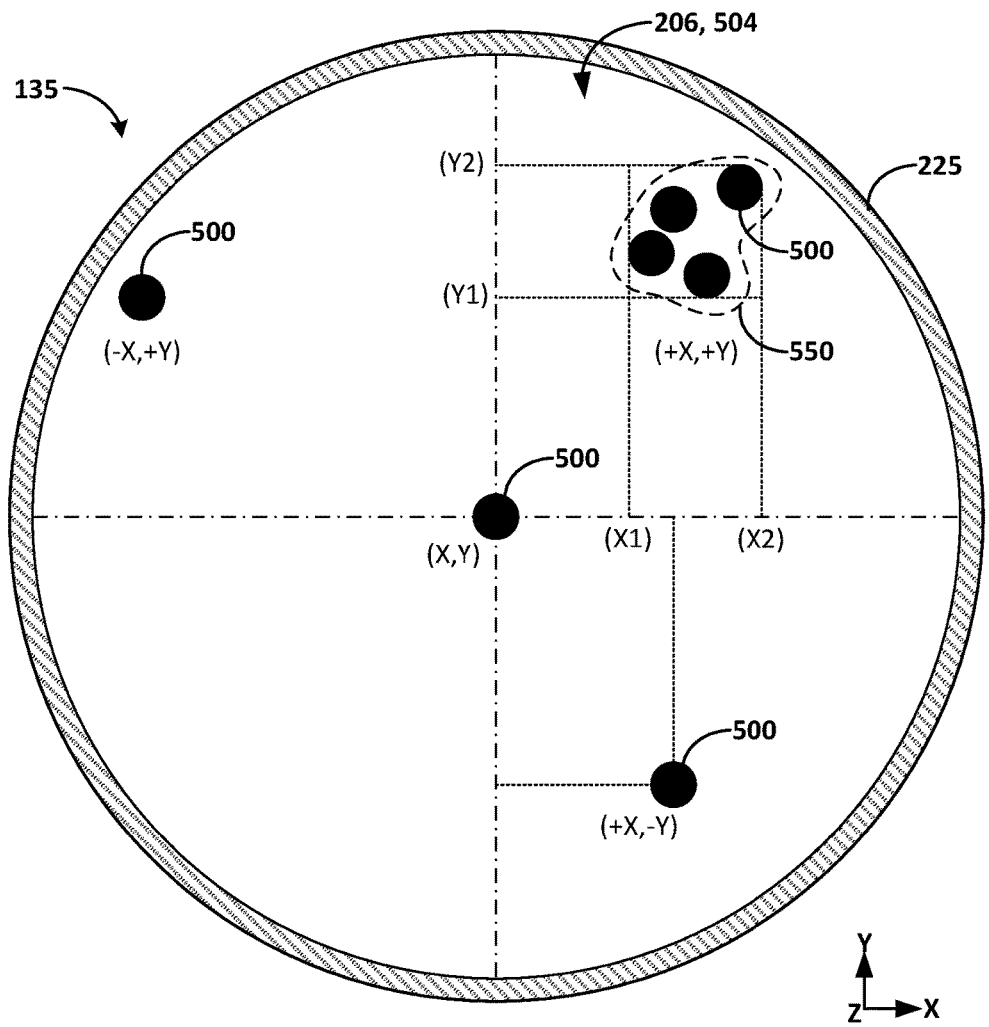
FIG. 5B schematically depicts a facing view of an exemplary optical element assembly that has optical anomalies.

FIG. 5B shows exemplary X,Y coordinates for a plurality of optical anomalies 500 on an optical element 206. An optical element monitoring system 200 may be configured to determine an anomalous region 550 of an optical element 206. An anomalous region 550 may be determined based at least in part on a size of an optical anomaly 500 and/or a quantity of optical anomalies 500 in proximity to one another. An anomalous region 550 may define a perimeter around one or more optical anomalies 500. The anomalous region 550 may be configured and arranged so as to provide a buffer or space between the perimeter of the anomalous region 550 and the one or more optical anomalies 500 within the anomalous region 550.

Figure 6:
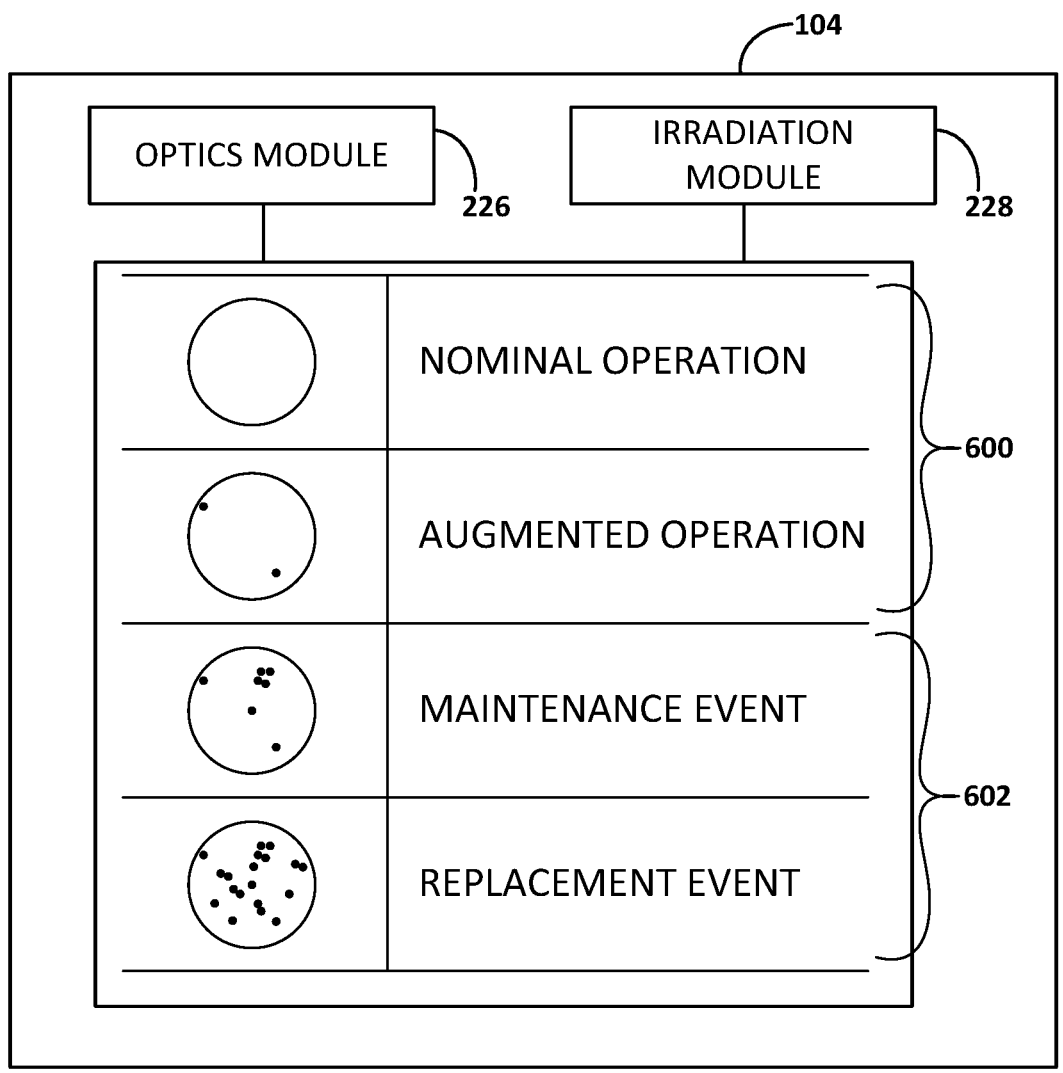
FIG. 6 schematically depicts an exemplary control system configured to maintain an optical assembly in connection with, and/or that may be included as part of, an optical element monitoring system.

Referring now to FIG. 6, an exemplary control system 104 will be further described. The control system 104 may be configured to perform control operations associated with an optical element monitoring system 200, including operation associated with an optics module 226 and/or operations associated with an irradiation module 228. The control operations may include optical element monitoring operations, such as determining one or more operational states 600 and/or determining one or more remedial events 602. The one or more operational states 600 and/or determining one or more remedial events 602 may be determined responsive at least in part to an optical anomaly having been detected and/or responsive to an absence of an optical anomaly. The one or more operational states 600 may include a nominal operational state and/or one or more augmented operational states, including, for example, one or more operational states 600 as for an additive manufacturing machine 102, an energy beam system 134, and/or one or more irradiation devices 138, 140 and/or other components thereof.

An optics module 226 may be configured to perform an optical element monitoring operation that includes determining a nominal operational state. The irradiation module 228 may cause the energy beam system 134 to perform one or more operations in accordance with the nominal operational state. A nominal operational state may be determined in the absence of an optical anomaly, and/or in the event of an optical anomaly having been determined to be immaterial to nominal operation, and/or in the event of an optical anomaly having been determined to be mitigatable such that nominal operation may be sustained.

Additionally, or in the alternative, an optics module 226 may be configured to perform an optical element monitoring operation that includes determining an augmented operational state. The irradiation module 228 may cause the energy beam system 134 to perform one or more augmented operating conditions in accordance with the augmented operational state. An augmented operational state may be determined, for example, in the event of an optical anomaly, such as in the event of an optical anomaly having been determined to be material to nominal operation an additive manufacturing machine 102, an energy beam system 134, and/or one or more irradiation devices 138, 140 and/or other components thereof. An augmented additive manufacturing operation may include, by way of example, augmenting one or more energy beam parameters, augmenting a scan field 144, 150 usable by an energy beam 142, 148, and/or augmenting an allocation of an interlace region 154 between a plurality of irradiation devices 138, 140, responsive at least in part to an optical anomaly having been detected and/or responsive to an absence of an optical anomaly. An augmented additive manufacturing operation may allow an additive manufacturing machine 102, an energy beam system 134, and/or one or more irradiation devices 138, 140 and/or other components thereof to continue operating, for example, until one or more future remedial events 602 take place. An augmented additive manufacturing operation may include irradiating sequential layers of a powder bed while avoiding one or more optical anomalies as determined by the optics module 226. Additionally, or in the alternative, one or more portions of the build plane 130, such as one or more portions of an interlace region 154, may be assigned to be irradiated by respective ones of a plurality of irradiation devices 138, 140, based at least in part on a location of one or more optical anomalies determined by the optics module. An optics module 226 may designate one or more portions of a build plane region 146, 152 as useable and/or unusable for additively manufacturing a three-dimensional object based at least in part on one or more optical anomalies on an optical element 206.

Additionally, or in the alternative, an optics module 226 may be configured to perform an optical element monitoring operation that includes determining one or more remedial events 602. The irradiation module 228 may cause the energy beam system 134 to perform one or more operations in accordance with the one or more remedial events 602. The one or more remedial events 602 may include one or more maintenance events and/or one or more replacement events. The one or more maintenance events may include cleaning, repair, and/or calibration events, for example, responsive at least in part to an optical anomaly having been detected. The one or more replacement events may include replacing one or more optical elements 206, for example, responsive at least in part to an optical anomaly having been determined by the optics module 226.

Figure 7A:
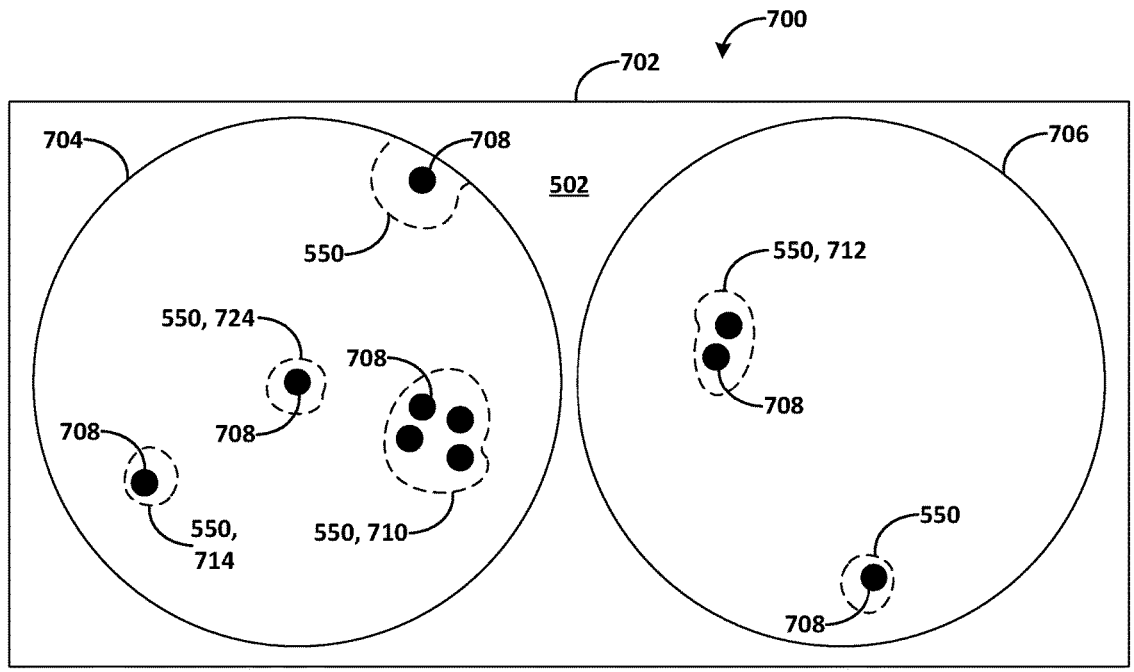
FIG. 7A schematically depicts an exemplary accumulation of contaminants on optical elements of an optical assembly.
Figure 7B:
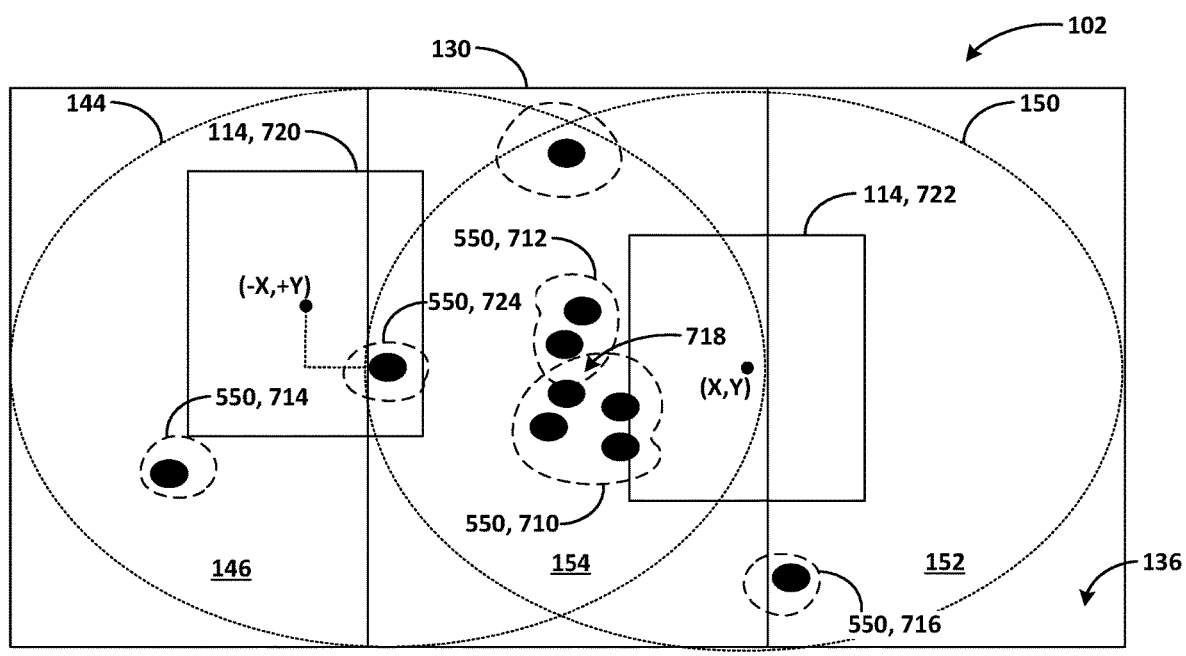
FIG. 7B schematically depicts exemplary optical element contaminants mapped to a build plane corresponding, by way of example, to the contaminants on the optical elements of the optical assembly shown in FIG. 7A.

Referring now to FIGS. 7A and 7B, an augmented additive manufacturing operation will be described. The augmented additive manufacturing operation may be performed during an augmented operational state. The augmented additive manufacturing operation may be determined at least in part by an optical element monitoring system 200. The augmented additive manufacturing operation may be determined based at least in part on an augmented operational state determined by the optical element monitoring system 200. By way of, a control system 104 may include an optics module 226 configured to determine an augmented operational state and to provide a control command configured to cause an augmented additive manufacturing operation. Additionally, or in the alternative, a control system 104 may include an irradiation module 228 configured to cause an augmented additive manufacturing operation, for example, based at least in part on a control command from the optics module 226. The control system 104 may be configured to cause an additive manufacturing machine 102 to carry out an augmented additive manufacturing operation, for example, based at least in part on a control command from an optics module 226 and/or a control command from an irradiation module 228.

FIG. 7A shows visual depiction of assessment data 700. The assessment data may include data from a light sensor 208, such as a signal and/or a data file. Additionally, or in the alternative, the assessment data 700 may be embodied in a digital image 702. The assessment data 700 may include a digital image 702 representing optical anomalies on one or more optical elements 206, such as a first one or more optical elements 704 and/or a second one or more optical elements 706. The first one or more optical elements 704 may correspond to and/or may define a portion of a first irradiation device 138. The second one or more optical elements 706 may correspond to and/or may define a portion of a second irradiation device 140. The digital image 702 may be generated from assessment data obtained from an optical element monitoring system 200, such as assessment data obtained at least in part from one or more light sensors 208. The digital image 702 may include one or more anomalous regions 550. The one or more anomalous regions 550 may respectively define a portion of the digital image 702 corresponding to one or more optical anomalies 500 determined from the assessment data 700. As shown, the optical anomalies 500 may be digitally represented in the assessment data 700 and/or in a digital image 702, such as in the form of a digitally represented optical anomaly 708.

Any suitable image processing technology may be utilized to process the assessment data 700, including, for example, a computer vision program that detects pixels in the assessment data and/or signals from a light sensor 208. A digital image 702 may be provided, for example, to visually depict assessment data 700. The digital image 702 may be provided for display, such as on a visual display associated with a user interface 108. It will be apricated however, that a digital image 702 need not be displayed nor even generated. Rather, the digital image 702 may be provided in the figures for the illustrative purpose of visualizing the assessment data 700.

FIG. 7B shows a build plane 130 of an additive manufacturing machine 102. The build plane 130 may include a first build plane region 146 and a second build plane region 152. The first build plane region 146 and a second build plane region 152 may overlap with one another, and the overlapping portion may define an interlace region 154. As shown in FIG. 1, the first build plane region 146 may be irradiated by a first energy beam 142 from a first irradiation device 138, and the second build plane region 152 may be irradiated by a second energy beam 148 from a second irradiation device 140. As shown in FIG. 7B, the first scan field 144 of the first energy beam 142 and the second scan field 150 of the second energy beam 148 are superimposed on the build plane 130. At least a portion of the interlace region 154 may be irradiated by the first energy beam 142 from the first irradiation device 138 and/or the second energy beam 148 from the second irradiation device 140.

As shown in FIG. 7B, exemplary anomalous regions 550 and the corresponding digitally represented optical anomalies 708 from FIG. 7A are superimposed on the build plane 130. As shown, the assessment data 700 may include a first anomalous region 710 corresponding to the first one or more optical elements 704, and/or a second anomalous region 712 corresponding to the second one or more optical elements 706. Irradiation of a build plane 130 may be assigned to respective irradiation devices 138, 140 based at least in part on one or more anomalous regions 550 identified in the assessment data 700. Additionally, or in the alternative, one or more irradiation parameters may be augmented based at least in part on one or more optical anomalies 500 and/or one or more anomalous regions 550 identified in the assessment data 700. Exemplary irradiation parameters that may be augmented include beam power, spot size, scan speed, power density profile.

Portions of the interlace region 154 may be assigned as between the first irradiation device 138 and the second irradiation device 140 based at least in part on one or more anomalous regions 550 identified in the assessment data 700. For example, portions of the interlace region 154 may be assigned as between the first irradiation device 138 and the second irradiation device 140 so as to avoid anomalous regions 550. By way of example, irradiation may be performed in a first portion of the interlace region 154 corresponding to the first anomalous region 710 by the second energy beam 148 from the second irradiation device 140. In this way, any optical anomalies 500 corresponding to the first anomalous region 710 may be avoided. Additionally, or in the alternative, irradiation may be performed in a second portion of the interlace region 154 corresponding to the second anomalous region 712 by the first energy beam 142 from the first irradiation device 138. In this way, any optical anomalies 500 corresponding to the second anomalous region 712 may be avoided.

One or more portions of the build plane 130 may be designated for augmented irradiation based at least in part on one or more anomalous regions 550 identified in the assessment data 700. Augmented irradiation may include augmenting at least one irradiation parameter and/or restricting irradiation by an irradiation device 138, 140 that includes or utilizes an optical element 206 that has an optical anomaly 500 corresponding to the anomalous region 550 designated for augmented irradiation. A portion of the first build plane region 146 corresponding to an anomalous region 550 associated with the first one or more optical elements 704 may be designated as a non-irradiation region. Additionally, or in the alternative, a portion of the second build plane region 152 corresponding to an anomalous region 550 associated with the second one or more optical elements 706 may be designated as a non-irradiation region. By way of example, FIG. 7B shows a third anomalous region 714 in the first build plane region 146 and a fourth anomalous region 716 in the second build plane region 152. As another example, a portion of the interlace region 154 corresponding to an overlapping portion of the first anomalous region 710 and the second anomalous region 712 may define a fifth anomalous region 718. One or more irradiation parameters may be augmented to at least partially mitigate and/or offset the existence of an optical anomaly 500. In this way, irradiation may be performed even in the existence of an optical anomaly 500. Additionally, or in the alternative, irradiation may be restricted with respect to portions of the build plane 130 that correspond to an anomalous region 550. For example, irradiation may be restricted when augmenting one or more irradiation parameters may be insufficient to satisfactorily mitigate and/or offset the existence of an optical anomaly 500. In this way, the potential for an optical anomaly 500 to cause a quality problem in an additively manufactured object 114 may be avoided. By way of example, the fifth anomalous region 718 may be restricted from being irradiated, such as when the optical anomalies 500 associated with the overlapping portion of the first anomalous region 710 and the second anomalous region 712 might not be, or cannot be, satisfactorily mitigated and/or offset by augmenting one or more irradiation parameters.

A location of a build plane 130 for additively manufacturing an object 114, such as X,Y coordinates of the build plane 130, may be selected based at least in part on one or more anomalous regions 550 identified in the assessment data 700. For example, one or more objects 114 may be additively manufactured at locations of the build plane 130 selected based at least in part to avoid one or more anomalous regions 550 and/or to minimize the number of anomalous regions 550 that may overlap the object 114. Such location of the build plane 130 may be selected based at least in part on one or more one or more layers of the object 114, including an aggregate cross-sectional area of a plurality of layers of the object 114 and/or a cross-sectional area of any one or more layers of the object 114. By way of example, FIG. 7B shows a location for a first object 720 and a second object 722. The first object 720 may be adjusted and/or offset, for example, to avoid the third anomalous region 714. The offset may be applied with respect to a center point of the first build plane region 146 relative to a center point of the first object 720. The first object 720 may be overlapped by a sixth anomalous region 724 associated with the first one or more optical elements 704. The portion of the first object 720 overlapped by the sixth anomalous region 724 may be irradiated by the second irradiation device 140, thereby avoiding any optical anomalies 500 associated with the sixth anomalous region 724. Additionally, or in the alternative, the portion of the first object 720 overlapped by the sixth anomalous region 724 may be irradiated by the first irradiation device 138 with one or more augmented irradiation parameters. The second object 722, such as a center point of the second object 722, may be aligned with respect to the center point of the second build plane region 152. The second object 722 may be overlapped by the first anomalous region 710. The entirety of the second object 722, including the portion of the second object 722 overlapped by the first anomalous region 710, may be irradiated by the second irradiation device 140, thereby avoiding any optical anomalies 500 associated with the first anomalous region 710. Additionally, or in the alternative, the portion of the second object 722 overlapped by the first anomalous region 710 may be irradiated by the first irradiation device 138 with one or more augmented irradiation parameters.

Figure 8:
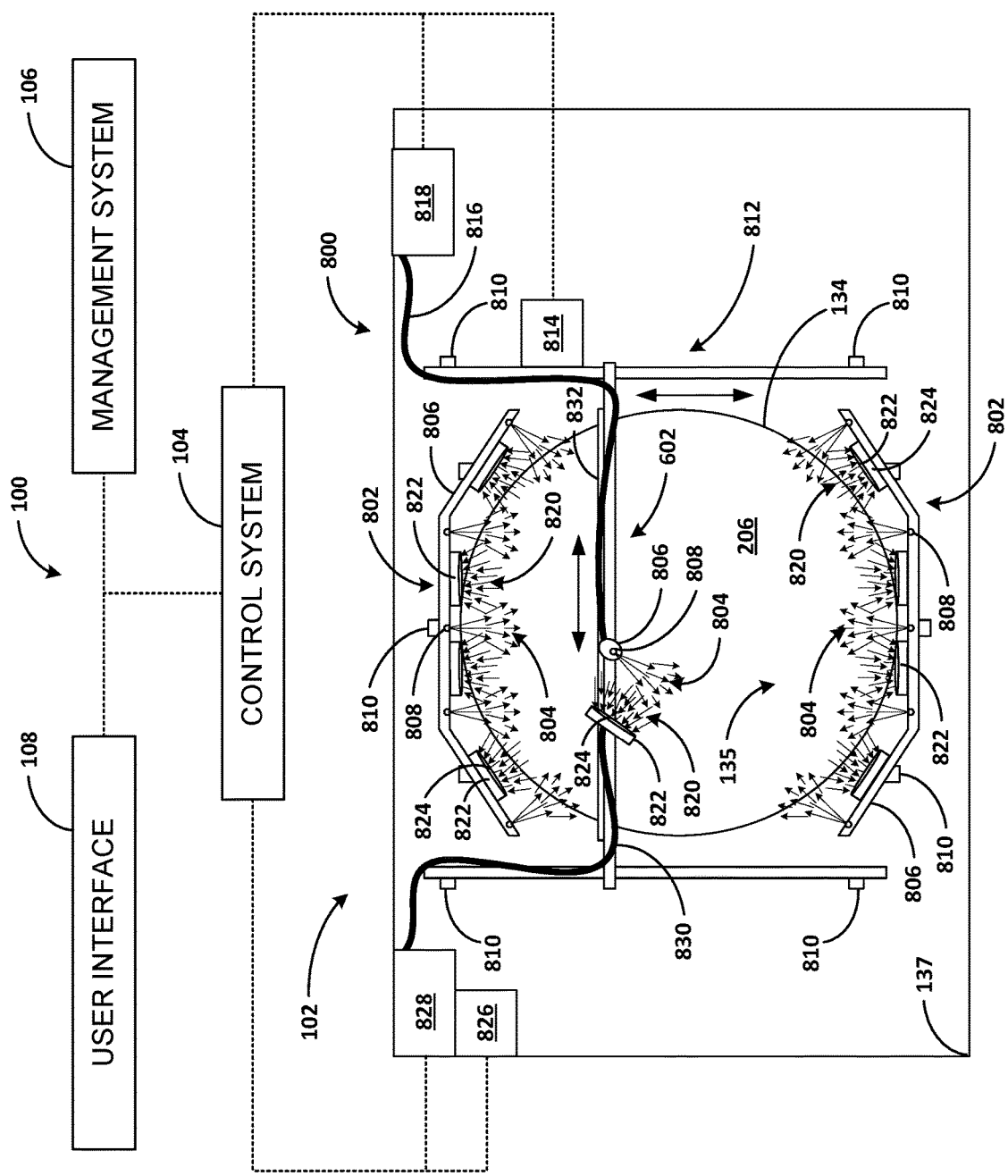
FIG. 8 schematically depicts an exemplary maintenance system.

Now referring to FIG. 8, an optical element monitoring system 200 may include a maintenance system 800. The maintenance system 800 may include one or more components configured to perform one or more maintenance operations associated with a maintenance event, such as one or more maintenance operations associated with cleaning, repairing, and/or calibrating one or more components of the additive manufacturing machine 102, the energy beam system 134, the imaging system 162, and/or the optical element monitoring system 200. As shown in FIG. 8, a maintenance system 800 may include one or more cleaning assemblies 802 configured to apply a stream of cleaning fluid 804 to one or more optical elements 206 of an optical assembly 135. For example, a cleaning assembly 802 may include one or more sprayers 806 configured to spray cleaning fluid 804 in proximity to the one or more optical elements 206. The one or more sprayers 806 may be in the form of one or more individual spray elements and/or one or more spray manifolds. The one or more sprayers 806 may include one or more spray nozzles 808 oriented or orientable in proximity to one or more optical anomalies 500 and/or anomalous regions 550 of the one or more optical elements 206.

The one or more sprayers 806 may be mounted inside a process chamber 137 of an additive manufacturing machine. For example, the sprayers 806 may be mounted on one or more chamber frames 810. The one or more chamber frames 810 may be mounted inside the process chamber 137 and/or the one or more chamber frames 810 may define a portion of the process chamber 137. Additionally, or in the alternative, the one or more sprayers 806 may be mounted to a gantry system 812. The gantry system 812 may be mounted to one or more of the chamber frames 810. The gantry system 812 may include a gantry motor 814 configured to move one or more sprayers 806 in one or more directions, such as a horizontal, lateral, and/or vertical direction, relative to one or more optical elements 206 intended to be sprayed with cleaning fluid 804 from the one or more sprayers 806. The cleaning fluid 804 may be supplied to the one or more sprayers 806 by one or more fluid supply lines 816. The cleaning fluid 804 may be housed in a fluid reservoir 818, and the one or more fluid supply lines 816 may provide fluid communication between the fluid reservoir 818 and the one or more sprayers 806. Any suitable cleaning fluid 804 may be utilized, including gaseous and/or liquid fluids. The cleaning fluid 804 may include an inert gas. Additionally, or in the alternative, the cleaning fluid 804 may include water or alcohol. The cleaning fluid 804 may include a surfactant, such as a detergent, a wetting agent, an emulsifier, a foaming agent, and/or a dispersant.

In addition, or as an alternative, to applying a stream of cleaning fluid 804, a maintenance system 800 may include one or more cleaning assemblies 802 configured to provide a vacuum stream 820 in proximity to one or more optical elements 206 of an optical assembly 135. For example, a cleaning assembly 802 may include one or more vacuums 822 configured to intake the vacuum stream 820. The one or more vacuums 822 may be in the form of one or more individual vacuum elements and/or one or more vacuum manifolds. The vacuum stream 820 may include any fluid or solid material, or combination thereof, such as the stream of cleaning fluid sprayed from a sprayer 806 and/or contaminants dislodged by the stream of cleaning fluid 804. The one or more vacuums 822 may include one or more vacuum nozzles 824. The one or more vacuum nozzles 824 may be oriented or orientable in proximity one or more optical anomalies 500 and/or anomalous regions 550 of the one or more optical elements 206.

The one or more vacuums 822 may be mounted inside a process chamber 137 of an additive manufacturing machine. For example, the vacuums 822 may be mounted on one or more chamber frames 810. The one or more chamber frames 810 may be mounted inside the process chamber 137 and/or the one or more chamber frames 810 may define a portion of the process chamber 137. Additionally, or in the alternative, the one or more vacuums 822 may be mounted to a gantry system 812. The gantry system 812 may be mounted to one or more of the chamber frames 810. The gantry motor 814 may be configured to move one or more vacuums 822 in one or more directions, such as a horizontal, lateral, and/or vertical direction, relative to one or more optical elements 206 intended to receive a vacuum stream 820 flowing into the one or more vacuums 822. The vacuum stream may be provided by way of a vacuum pump 826. The vacuum stream 820 may flow to a vacuum reservoir 828 by way of one or more vacuum lines 830 that provides fluid communication between the one or more vacuums 822 and the vacuum reservoir 828.

An exemplary maintenance system may include one or more wipers 832. The one or more wipers 832 may be configured to wipe one or more optical elements 206, such as in coordination with operation of the one or more sprayers 806 and/or in coordination with the one or more vacuums 822. For example, the one or more sprayers 806 may spray cleaning fluid 804 onto a surface of the one or more optical elements 206. The one or more wipers 832 may wipe the cleaning fluid 804 and contaminants such as powder material, dust, soot, residues from fumes or vapor, and the like away from the one or more optical elements 206. The one or more wipers 832 may be mounted to a gantry system 812. The one or more wipers 832 may be movable by operation of the gantry system 812. Additionally, or in the alternative, the one or more wipers 832 may be operable independently from the gantry system 812. A wiper 832 may be utilized when cleaning an optical element 206 using a liquid and/or a gas cleaning fluid 804. However, a wiper may not be necessary, such as with a contactless cleaning approach, using a cleaning fluid 804 without a wiper 832, to avoid physical contact with the optical element 206 by a solid object such as a wiper 832. A wiper 832 may be configured to wipe cleaning fluid and/or contaminants from a perimeter of an optical element 206, such as from a frame 225 supporting and/or surrounding an optical element 206.

One or more elements of the maintenance system 800 may be communicatively coupled with a control system 104. The control system 104 may be configured to cause the maintenance system 800 to perform a maintenance operation, such as cleaning operation. The cleaning operation may be initiated as a maintenance event, or at least a portion thereof, such as in connection with a remedial event 602 described, for example, with reference to FIG. 6. For example, the control system 104 may include an optics module 226 configured to cause the maintenance system 800 to perform a cleaning operation as, or in connection with, a remedial event 602 responsive to one or more optical anomalies 500 having been detected by the optics module 226. The maintenance system 800 may be configured to selectively spray cleaning fluid 804 on a region of an optical element 206 that corresponds to an anomalous region 550, such as responsive to the anomalous region 550 having been determined by the optics module 226. Additionally, or in the alternative, the maintenance system 800 may be configured to selectively vacuum a region of an optical element 206 that corresponds to an anomalous region 550, such as responsive to the anomalous region 550 having been determined by the optics module 226.

Now turning to FIG. 9, and exemplary control system 104 will be described. A control system 104 may be configured to perform one or more control operations. A control system 104 may be configured to output one or more control commands associated with an additive manufacturing machine 102. The control commands may include control commands configured to control one or more controllable components of an additive manufacturing system 100 and/or an additive manufacturing machine 102. For example, one or more control commands may be configured to control operations of optical element monitoring system 200 and/or a maintenance system 800.

Figure 9:
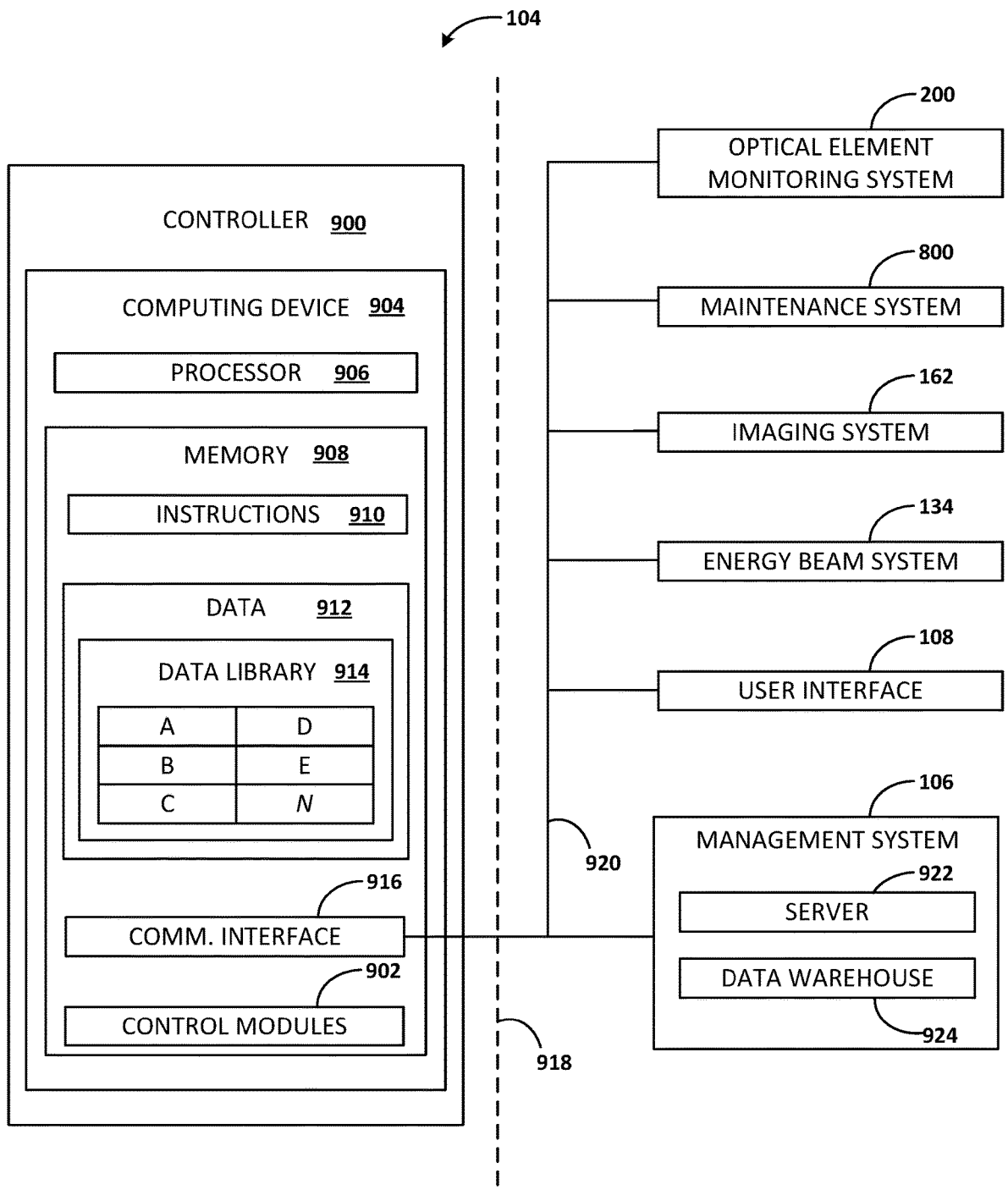
FIG. 9 schematically depicts an exemplary control system.

As shown in FIG. 9, an exemplary control system 104 includes a controller 900. The controller may include one or more control modules 902 configured to cause the controller 900 to perform one or more control operations. The one or more control modules 902 may include control logic executable to provide control commands configured to control one or more controllable components associated with an additive manufacturing machine 102, such as controllable components associated with an energy beam system 134, an imaging system 162, an optical element monitoring system 200 and/or a maintenance system 800. For example, a control module 902 may be configured to provide one or more control commands executable to control operation of a light source 202, a light sensor 208, a scanner 210 and/or other controllable components associated with an optical element monitoring system 200. Additionally, or in the alternative, control module 902 may be configured to provide one or more control commands executable to control operation of one or more sprayers 806, one or more vacuums 822, and/or other controllable components associated with a maintenance system 800.

The controller 900 may be communicatively coupled with an additive manufacturing machine 102. The controller 900 may be communicatively coupled with one or more components of an additive manufacturing machine 102, such as one or more components of an optical element monitoring system 200, a maintenance system 800, an energy beam system 134, and/or an imaging system 162. The controller 900 may also be communicatively coupled with a management system 106 and/or a user interface 108.

The controller 900 may include one or more computing devices 904, which may be located locally or remotely relative to the additive manufacturing machine 102, the imaging system 162, the optical element monitoring system 200, and/or the maintenance system 800. The one or more computing devices 904 may include one or more processors 906 and one or more memory devices 908. The one or more processors 906 may include any suitable processing device, such as a microprocessor, microcontroller, integrated circuit, logic device, and/or other suitable processing device. The one or more memory devices 908 may include one or more computer-readable media, including but not limited to non-transitory computer-readable media, RAM, ROM, hard drives, flash drives, and/or other memory devices 908.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 908 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 908 may store information accessible by the one or more processors 906, including computer-executable instructions 910 that can be executed by the one or more processors 906. The instructions 910 may include any set of instructions which when executed by the one or more processors 906 cause the one or more processors 906 to perform operations, including optical element monitoring operations, maintenance operations, cleaning operations, calibration operations, and/or additive manufacturing operations.

The memory devices 908 may store data 912 accessible by the one or more processors 906. The data 912 can include current or real-time data 912, past data 912, or a combination thereof. The data 912 may be stored in a data library 914. As examples, the data 912 may include data 912 associated with or generated by an additive manufacturing system 100 and/or an additive manufacturing machine 102, including data 912 associated with or generated by the controller 900, an additive manufacturing machine 102, an energy beam system 134, an imaging system 162, an optical element monitoring system 200, a maintenance system 800, a management system 106, a user interface 108, and/or a computing device 904. Such data 912 may pertain to operation of an energy beam system 134, an imaging system 162, an optical element monitoring system 200 and/or a maintenance system 800. The data 912 may also include other data sets, parameters, outputs, information, associated with an additive manufacturing system 100 and/or an additive manufacturing machine 102.

The one or more computing devices 904 may also include a communication interface 916, which may be used for communications with a communication network 918 via wired or wireless communication lines 920. The communication interface 916 may include any suitable components for interfacing with one or more network(s), including for example, transmitters, receivers, ports, controllers, antennas, and/or other suitable components. The communication interface 916 may allow the computing device 904 to communicate with various nodes on the communication network 918, such as nodes associated with the additive manufacturing machine 102, the energy beam system 134, the imaging system 162, the optical element monitoring system 200, the maintenance system 800, the management system 106, and/or a user interface 108. The communication network 918 may include, for example, a local area network (LAN), a wide area network (WAN), SATCOM network, VHF network, a HF network, a Wi-Fi network, a WiMAX network, a gatelink network, and/or any other suitable communication network 918 for transmitting messages to and/or from the controller 900 across the communication lines 920. The communication lines 920 of communication network 918 may include a data bus or a combination of wired and/or wireless communication links.

The communication interface 916 may allow the computing device 904 to communicate with various components of an additive manufacturing system 100 and/or an additive manufacturing machine 102 communicatively coupled with the communication interface 916 and/or communicatively coupled with one another, including an energy beam system 134, an imaging system 162, an optical element monitoring system 200, and/or a maintenance system 800. The communication interface 916 may additionally or alternatively allow the computing device 904 to communicate with the management system 106 and/or the user interface 108. The management system 106 may include a server 922 and/or a data warehouse 924. As an example, at least a portion of the data 912 may be stored in the data warehouse 924, and the server 922 may be configured to transmit data 912 from the data warehouse 924 to the computing device 904, and/or to receive data 912 from the computing device 904 and to store the received data 912 in the data warehouse 924 for further purposes. The server 922 and/or the data warehouse 924 may be implemented as part of a control system 104 and/or as part of the management system 106.

Figure 10:
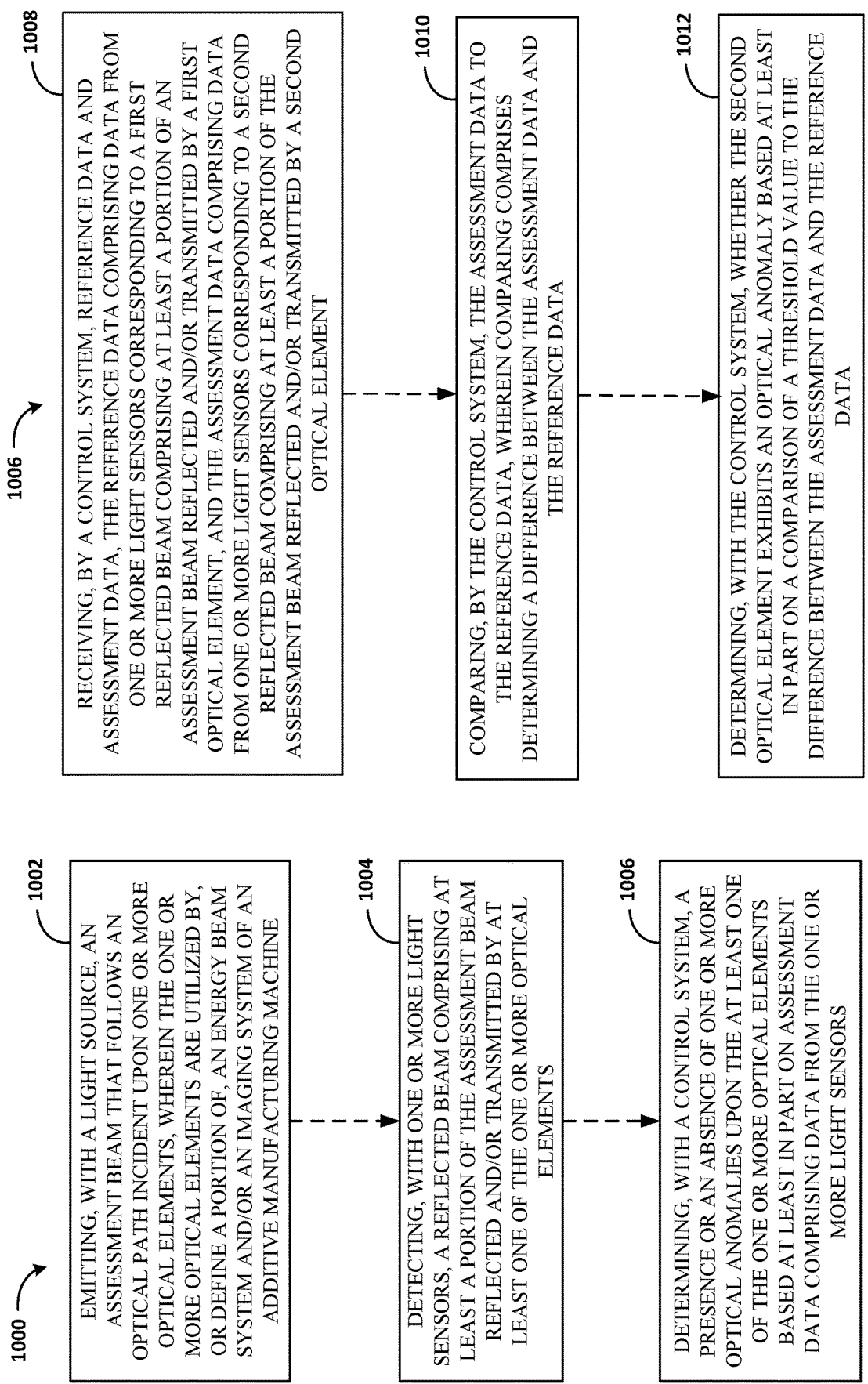
FIGS. 10A and 10B respectively show a flow chart depicting an exemplary method of determining an optical anomaly upon one or more optical elements of an additive manufacturing machine.

Now turning to FIGS. 10A and 10B, exemplary methods 1000 will be described for determining whether one or more optical elements 206 exhibit an optical anomaly 500. The one or more optical elements 206 may be utilized in an additive manufacturing machine 102, such as by an energy beam system 134 and/or an imaging system 162. The exemplary methods 1000 may include, or may be utilized with, methods 1000 of monitoring and/or maintaining an optical assembly, such as described herein with reference to FIG. 11. Exemplary methods of determining whether one or more optical elements 206 exhibit an optical anomaly 500 may be performed in connection with methods of additively manufacturing a three-dimensional object 114.

As shown in FIG. 10A, an exemplary method 1000 may include, at block 1002, emitting, with a light source 202, an assessment beam 204 that follows an optical path incident upon one or more optical elements 206. The one or more optical elements 206 may be utilized by, or define a portion of, an energy beam system 134 and/or an imaging system 162 of an additive manufacturing machine 102. The energy beam system 134 may be configured to emit an energy beam 142 utilized in an additive manufacturing process. The imaging system 162 may be configured to monitor one or more operating parameters of the additive manufacturing process.

An exemplary method 1000 may include, at block 1004, detecting, with one or more light sensors 208, a reflected beam 216 comprising at least a portion of the assessment beam 204 reflected and/or transmitted by at least one of the one or more optical elements 206. An exemplary method 1000 may include, at block 1006, determining, with a control system 104, whether the one or more optical elements 206 exhibit an optical anomaly 500 based at least in part on assessment data. The assessment data may include data from the one or more light sensors 208 and/or data generated based at least in part on the data from the one or more light sensors 208.

Determining whether the one or more optical elements 206 exhibit an optical anomaly 500, such as at block 1006, may include one or more operations performed by a control system 104. For example, as shown in FIG. 10B, at block 1008, example, an exemplary method 1000 may include (and/or block 1006 may include), receiving, by the control system 104, reference data from one or more light sensors 208 corresponding to a first reflected beam 216 that includes at least a portion of an assessment beam 204 reflected and/or transmitted by a first optical element 206. Additionally, or in the alternative, block 1008 may include receiving assessment data from one or more light sensors corresponding to a second reflected beam that includes at least a portion of the assessment beam 204 reflected and/or transmitted by a second optical element 206. An exemplary method 1000 may include (and/or block 1006 may include), at block 1010, comparing, by the control system 104, the assessment data to the reference data. The comparing performed at block 1010 may include determining a difference between the assessment data and the reference data. At block 1012, exemplary method 1000 may include (and/or block 1006 may include) determining, with the control system 104, whether the second optical element 206 exhibits an optical anomaly 500 based at least in part on the difference between the assessment data and the reference data exceeding a threshold value. Additionally, or in the alternative, block 1012 may include determining, with the control system 104, an absence of an optical anomaly 500 upon the second optical element 206 based at least in part on the difference between the assessment data and the reference data being within a threshold value.

Now turning to FIG. 11, exemplary methods 1100 of monitoring and/or maintaining an optical assembly 135 will be described, including exemplary methods 1100 of additively manufacturing a three-dimensional object 114, such as methods of additively manufacturing a three-dimensional object 114 using an additive manufacturing system 100 that includes an optical element monitoring system 200 and/or a maintenance system 800. Exemplary methods 1100 of monitoring and/or maintaining an optical assembly 135 may include methods of determining an optical anomaly 500 upon one or more optical elements 206 of an additive manufacturing machine 102, such as described herein with reference to FIG. 10.

Figure 11:
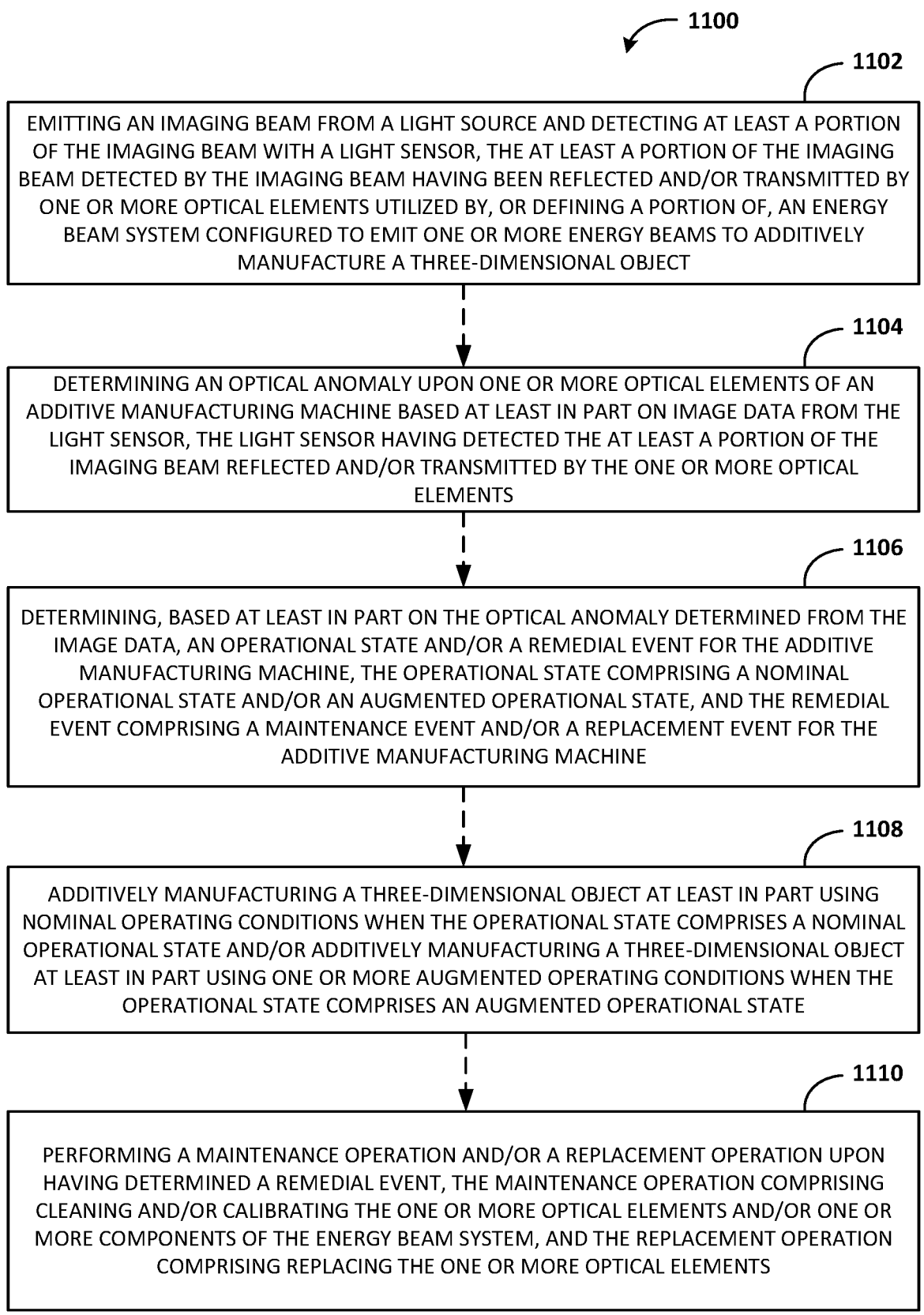
FIG. 11 shows a flow chart depicting an exemplary method of maintaining an optical assembly.

As shown in FIG. 11, an exemplary method 1100 may include, at block 1102, emitting an assessment beam 204 from a light source 202 and detecting at least a portion of the assessment beam 204 with a light sensor 208. The at least a portion of the assessment beam 204 detected by the assessment beam 204 may be reflected and/or transmitted by one or more optical elements 206 of an additive manufacturing machine 102 such that the assessment beam 204 becomes incident upon the light sensor 208. The one or more optical elements 206 may be utilized by, or define a portion of, an energy beam system 134 configured to emit one or more energy beams 142, 148 to additively manufacture a three-dimensional object 114. An exemplary method may include, at block 1104, determining an optical anomaly 500 upon one or more optical elements 206 of an additive manufacturing machine 102 based at least in part on assessment data 700 of an assessment beam 204 detected by light sensor 208. The assessment beam 204 detected by the light sensor 208 may be emitted by a light source 202 and reflected and/or transmitted by one or more optical elements 206 such that the assessment beam 204 becomes incident upon the light sensor 208.

An exemplary method 1100 may include, at block 1106, determining, based at least in part on the optical anomaly 500 determined from the assessment data 700, an operational state and/or a remedial event for the additive manufacturing machine 102, such as for the one or more optical elements 206 and/or for an energy beam system 134 that comprises and/or utilizes the one or more optical elements 206. The operational state may include a nominal operational state and/or an augmented operational state. The remedial event may include a maintenance event and/or a replacement event for the additive manufacturing machine 102, such as for the one or more optical elements 206 and/or for the energy beam system 134.

An exemplary method 1100 may include, at block 1108, additively manufacturing a three-dimensional object 114 at least in part using nominal operating conditions when the operational state comprises a nominal operational state. Additionally, or in the alternative, an exemplary method 1100 may include, at block 1108, additively manufacturing the three-dimensional object 114 at least in part using one or more augmented operating conditions when the operational state comprises an augmented operational state. An exemplary method 1100 may include, at block 1110, performing a maintenance operation and/or a replacement operation upon having determined a remedial event. The maintenance operation may include cleaning, repairing, and/or calibrating the additive manufacturing machine, such as the one or more optical elements 206 and/or the one or more components of the energy beam system 134. The replacement operation may include replacing the one or more optical elements 206 and/or the one or more components of the energy beam system 134.

Further aspects of the presently disclosed subject matter are provided by the subject matter of any of the following clauses and/or combinations thereof:

1. An additive manufacturing machine, comprising: an energy beam system configured to emit an energy beam utilized in an additive manufacturing process; one or more optical elements utilized by, or defining a portion of, the energy beam system and/or an imaging system of the additive manufacturing machine, the imaging system configured to monitor one or more operating parameters of the additive manufacturing process; a light source configured to emit an assessment beam that follows an optical path incident upon the one or more optical elements; one or more light sensors configured to detect a reflected beam comprising at least a portion of the assessment beam reflected and/or transmitted by at least one of the one or more optical elements; and a control system configured to determine, based at least in part on assessment data comprising data from the one or more light sensors, whether the one or more optical elements exhibit an optical anomaly.

2. The additive manufacturing machine of any clause herein, wherein the light source comprises an energy beam source of the energy beam system, and wherein the assessment beam emitted by the light source has a first energy level and the energy beam utilized in the additive manufacturing process has a second energy level when the energy beam is utilized to additively manufacture a three-dimensional objects, and wherein the first energy level is less than the second energy level.

3. The additive manufacturing machine of any clause herein, wherein the light source is utilized by the imaging system.

4. The additive manufacturing machine of any clause herein, wherein the one or more optical elements comprises a window that separates one or more components of the energy beam system and/or the imaging system from a process chamber within which powder material is irradiated by the energy beam during the additive manufacturing process.

5. The additive manufacturing machine of any clause herein, comprising: a scanner configured to orient the assessment beam to a scanner position, the scanner position mapped to a scan field corresponding to the one or more optical elements; wherein the control system is configured to determine a beam incidence location based at least in part on the scanner position corresponding to the data from the one or more light sensors, wherein the assessment beam becomes incident upon at least one of the one or more optical elements at the beam incidence location and/or wherein the reflected beam propagates from at least one of the one or more optical elements at the beam incidence location.

6. The additive manufacturing machine of any clause herein, wherein the beam incidence location is determined at least in part by mapping the scanner position to the data from the one or more light sensors.

7. The additive manufacturing machine of any clause herein, wherein the control system is configured to determine whether the one or more optical elements exhibit an optical anomaly based at least in part on a comparison of the assessment data to reference data.

8. The additive manufacturing machine of any clause herein, wherein the reference data comprises a threshold value.

9. The additive manufacturing machine of any clause herein, wherein the reference data is determined based at least in part on the reflected beam detected by the one or more light sensors when propagating from a first location of the one or more optical elements at a first time; and wherein the assessment data is determined based at least in part on the reflected beam detected by the one or more light sensors when propagating from the first location of the one or more optical elements at a second time and/or when propagating from a second location of the one or more optical elements at the first time or the second time.

10. The additive manufacturing machine of any clause herein, wherein the first location corresponds to the reflected beam propagating from a first surface of a first optical element, and/or wherein the second location corresponds to the reflected beam propagating from a second surface of the first optical element.

11. The additive manufacturing machine of any clause herein, wherein the first surface is a proximal surface and/or wherein the second surface is a distal surface.

12. The additive manufacturing machine of any clause herein, wherein the first location corresponds to the reflected beam propagating from a first optical element, and/or wherein the second location corresponds to the reflected beam propagating from a second optical element.

13. The additive manufacturing machine of any clause herein, wherein the first optical element is a distal optical element and/or wherein the second optical element is a proximal optical element.

14. The additive manufacturing machine of any clause herein, wherein the control system is configured to determine whether the one or more optical elements exhibit an optical anomaly based at least in part on a comparison of a first reflected beam to a second reflected beam; wherein the first reflected beam is detected by the one or more light sensors when propagating from a first location of the one or more optical elements; and wherein the second reflected beam is detected by the one or more light sensors when propagating from a second location of the one or more optical elements; and wherein the control system is configured to determine whether the one or more optical elements exhibit an optical anomaly based at least in part on data from the one or more light sensors indicating a difference between the first reflected beam and the second reflected beam.

15. The additive manufacturing machine of any clause herein, wherein the control system is configured to determine that the first location exhibits an optical anomaly based at least in part on data from the one or more light sensors indicating a first value corresponding to the first reflected beam exceeding a second value corresponding to the second reflected beam.

16. The additive manufacturing machine of any clause herein, comprising: a first light sensor configured to detect a first reflected beam propagating from a first one of the one or more optical elements; and a second light sensor configured to detect a second reflected beam propagating from a second one of the one or more optical elements; wherein the control system is configured to determine whether the first one of the one more optical elements exhibit an optical anomaly and/or whether the second one of the one or more optical elements exhibit an optical anomaly, based at least in part on a comparison of first assessment data to second assessment data, the first assessment data corresponding to the first light sensor having detected the first reflected beam, and the second assessment data corresponding to the second light sensor having detected the second reflected beam.

17. An optical element monitoring system configured to be used with an additive manufacturing machine, the optical element monitoring system comprising: a light source configured to emit an assessment beam that follows an optical path incident upon one or more optical elements; one or more light sensors configured to detect a reflected beam comprising at least a portion of the assessment beam reflected and/or transmitted by at least one of the one or more optical elements; and a control system configured to determine whether the one or more optical elements exhibit an optical anomaly based at least in part on assessment data comprising data from the one or more light sensors; wherein the one or more optical elements are utilized by, or define a portion of, an energy beam system and/or an imaging system of an additive manufacturing machine.

18. The optical element monitoring system configured as mentioned with respect to the additive manufacturing machine of any clause herein.

19. A method of determining an optical anomaly exhibited by an optical element utilized in an additive manufacturing machine, the method comprising: emitting, with a light source, an assessment beam that follows an optical path incident upon one or more optical elements; detecting, with one or more light sensors, a reflected beam comprising at least a portion of the assessment beam reflected and/or transmitted by at least one of the one or more optical elements; and determining, with a control system, whether the one or more optical elements exhibit an optical anomaly based at least in part on assessment data comprising data from the one or more light sensors; wherein the one or more optical elements are utilized by, or define a portion of, an energy beam system and/or an imaging system of an additive manufacturing machine, the energy beam system configured to emit an energy beam utilized in an additive manufacturing process, and the imaging system configured to monitor one or more operating parameters of the additive manufacturing process.

20. The method of any clause herein, wherein determining whether the one or more optical elements exhibit an optical anomaly comprises: receiving, by the control system, reference data and assessment data, the reference data comprising data from at least one of the one or more light sensors corresponding to a first reflected beam comprising at least a portion of the assessment beam reflected and/or transmitted by a first optical element, and the assessment data comprising data from at least one of the one or more light sensors corresponding to a second reflected beam comprising at least a portion of the assessment beam reflected and/or transmitted by a second optical element; comparing, by the control system, the assessment data to the reference data, wherein comparing comprises determining a difference between the assessment data and the reference data; and determining, with the control system, whether the second optical element exhibits an optical anomaly based at least in part on the difference between the assessment data and the reference data exceeding a threshold value.

21. A method of determining whether one or more optical elements utilized in an additive manufacturing machine exhibit an optical anomaly, the method comprising: receiving, by a control system, reference data and assessment data, the reference data comprising data from one or more light sensors corresponding to a first reflected beam comprising at least a portion of an assessment beam reflected and/or transmitted by a first optical element, and the assessment data comprising data from one or more light sensors corresponding to a second reflected beam comprising at least a portion of the assessment beam reflected and/or transmitted by a second optical element, the assessment beam having been emitted by a light source and following an optical path incident upon the first optical element and the second optical element; comparing, by the control system, the assessment data to the reference data, wherein comparing comprises determining a difference between the assessment data and the reference data; and determining, with the control system, whether the second optical element exhibits an optical anomaly based at least in part on a comparison of a threshold value to the difference between the assessment data and the reference data; wherein the one or more optical elements are utilized by, or define a portion of, an energy beam system and/or an imaging system of an additive manufacturing machine, the energy beam system configured to emit an energy beam utilized in an additive manufacturing process, and the imaging system configured to monitor one or more operating parameters of the additive manufacturing process.

22. A method of operating an additive manufacturing machine, the method comprising: determining an operational state and/or a remedial event for an additive manufacturing machine, the operational state and/or the remedial event determined based at least in part on one or more optical anomalies having been determined upon one or more optical elements based at least in part on assessment data from a light sensor, the one or more optical elements utilized by, or defining a portion of, an energy beam system configured to emit one or more energy beams to additively manufacture a three-dimensional object, the light sensor having detected a reflected portion of an assessment beam, the assessment beam emitted by a light source and the reflected portion reflected by the one or more optical elements, wherein the operational state comprises a nominal operational state and/or an augmented operational state, and wherein the remedial event comprises a maintenance event and/or a replacement event; additively manufacturing the three-dimensional object at least in part using nominal operating conditions when the operational state comprises a nominal operational state; and additively manufacturing the three-dimensional object at least in part using one or more augmented operating conditions when the operational state comprises an augmented operational state; and/or performing a maintenance operation upon having determined the remedial event that comprises the maintenance event, the maintenance operation comprising cleaning and/or calibrating the one or more optical elements and/or one or more components of the energy beam system; and/or performing a replacement operation upon having determined the remedial event that comprises the replacement event, the replacement operation comprising replacing the one or more optical elements.

23. The method of any clause herein, comprising: emitting the assessment beam from the light source and detecting the reflected portion of the assessment beam with the light sensor, the reflected portion of the assessment beam having been reflected by the one or more optical elements of the additive manufacturing machine.

24. The method of any clause herein, comprising: detecting the reflected portion of the assessment beam with the light sensor; and determining the one or more optical anomalies upon the one or more optical elements of the additive manufacturing machine based at least in part on the assessment data from the light sensor.

25. The method of any clause herein, comprising: determining the one or more optical anomalies based at least in part on a degree of focus and/or defocus of the at least a portion of the assessment beam detected by the light sensor.

26. The method of any clause herein, comprising: determining the one or more optical anomalies based at least in part on backscatter and/or forward scatter of the at least a portion of the assessment beam detected by the light sensor.

27. The method of any clause herein, comprising: determining the one or more optical anomalies upon the one or more optical elements of the additive manufacturing machine based at least in part on the assessment data from the light sensor, wherein determining the one or more optical anomalies comprises: determining an existence, location, and/or characteristic of the one or more optical anomalies.

28. The method of any clause herein, comprising: determining the existence, location, and/or characteristic of the one or more optical anomalies at least in part using a Maxwell equation.

29. The method of any clause herein, wherein the Maxwell equation comprises and/or is based at least in part on a Mie solution, a Rayleigh approximation, a Rayleigh-Gans approximation, and/or an anomalous diffraction approximation.

30. The method of any clause herein, wherein the one or more optical anomalies comprises contaminants on the one or more optical elements, and/or wherein the one or more optical anomalies comprises damage to the one or more optical elements.

31. The method of any clause herein, comprising: determining the operational state and/or the remedial event for the additive manufacturing machine based at least in part on an anomalous region of the one or more optical elements, wherein the anomalous region is determined based at least in part on a size and/or quantity of the one or more optical anomalies.

32. The method of any clause herein, comprising: performing a maintenance operation on the first optical element upon having determined the remedial event based at least in part on the one or more optical anomalies having been determined from the first reflected portion, the maintenance operation comprising cleaning and/or calibrating the first optical element and/or one or more components of the additive manufacturing machine that utilize the first optical element; and/or performing a maintenance operation on the second optical element upon having determined the remedial event based at least in part on the one or more optical anomalies having been determined from the second reflected portion, the maintenance operation comprising cleaning and/or calibrating the second optical element and/or one or more components of the additive manufacturing machine that utilize the second optical element.

33. The method of any clause herein, comprising: performing a replacement operation on the first optical element upon having determined the remedial event based at least in part on the one or more optical anomalies having been determined from the first reflected portion, the replacement operation comprising replacing the first optical element; and/or performing a replacement operation on the second optical element upon having determined the remedial event based at least in part on the one or more optical anomalies having been determined from the second reflected portion, the replacement operation comprising replacing the second optical element.

34. The method of any clause herein, wherein the additive manufacturing machine comprises a first irradiation device configured to irradiate a first build plane region with a first energy beam that passes through a first one or more optical elements, and a second irradiation device configured to irradiate a second build plane region with a second energy beam that passes through a second one or more optical elements, the first build plane region and the second build plane region overlapping one another at an interlace region; wherein the one or more augmented operating conditions comprises assigning at least a first portion of the interlace region to the second irradiation device when the one or more optical anomalies comprises a first one or more optical anomalies having been determined upon the first one or more optical elements, wherein the first energy beam would intersect the first one or more optical anomalies when oriented along a first beam path directed to the at least a first portion of the interlace region assigned to the second irradiation device; and/or wherein the one or more augmented operating conditions comprises assigning at least a second portion of the interlace region to the first irradiation device when the one or more optical anomalies comprises a second one or more optical anomalies having been determined upon the second one or more optical elements, wherein the second energy beam would intersect the second one or more optical anomalies when oriented along a second beam path directed to the at least a second portion of the interlace region assigned to the first irradiation device.

35. The method of any clause herein, wherein the one or more augmented operating conditions comprises: offsetting and/or adjusting a location on a build plane for an object to be additively manufactured.

36. The method of any clause herein, wherein the one or more augmented operating conditions comprises: providing a cleaning fluid in proximity to the one or more optical elements, the cleaning fluid provided by one or more sprayers; and/or providing a vacuum stream in proximity to the one or more optical elements, the vacuum stream provided by one or more vacuums.

37. The method of any clause herein, comprising: selectively spraying the cleaning fluid in proximity to a portion of the one or more optical elements determined based at least in part on a location of the one or more optical anomalies, the location of the one or more optical anomalies determined based at least in part on the assessment data; and/or selectively applying a vacuum stream in proximity to a portion of the one or more optical elements determined based at least in part on the location of the one or more optical anomalies determined based at least in part on the assessment data.

38. The method of any clause herein, wherein the one or more augmented operating conditions comprises: augmenting one or more irradiation parameters based at least in part on the one or more optical anomalies, the one or more irradiation parameters comprising: beam power, spot size, scan speed, and/or power density profile.

39. The method of any clause herein, wherein the one or more augmented operating conditions comprises: augmenting the one or more irradiation parameters based at least in part on the one or more optical anomalies when the one or more energy beams are oriented along a beam path intersected by the one or more optical anomalies.

40. An additive manufacturing system, the system comprising: an additive manufacturing machine comprising an energy beam system configured to emit one or more energy beams to additively manufacture a three-dimensional object, and one or more optical elements utilized by, or defining a portion of, the energy beam system; and a control system communicatively coupled with, or defining a portion of, the additive manufacturing machine, wherein the control system is configured to perform a method comprising: determining an operational state and/or a remedial event for the additive manufacturing machine, the operational state and/or the remedial event determined based at least in part on one or more optical anomalies having been determined upon the one or more optical elements based at least in part on assessment data from a light sensor, the light sensor having detected a reflected portion of an assessment beam, the assessment beam emitted by a light source and the reflected portion reflected by the one or more optical elements, wherein the operational state comprises a nominal operational state and/or an augmented operational state, and wherein the remedial event comprises a maintenance event and/or a replacement event; additively manufacturing the three-dimensional object at least in part using nominal operating conditions when the operational state comprises a nominal operational state; and additively manufacturing the three-dimensional object at least in part using one or more augmented operating conditions when the operational state comprises an augmented operational state; and/or performing a maintenance operation upon having determined the remedial event that comprises the maintenance event, the maintenance operation comprising cleaning and/or calibrating the one or more optical elements and/or one or more components of the energy beam system; and/or performing a replacement operation upon having determined the remedial event that comprises the replacement event, the replacement operation comprising replacing the one or more optical elements.

41. The additive manufacturing system of any clause herein, wherein the system is configured to perform the method of any clause herein.

42. A computer-readable medium comprising computer-executable instructions, which when executed by a processor associated with an additive manufacturing system, cause the additive manufacturing system to perform a method comprising: emitting, with a light source, an assessment beam that follows an optical path incident upon one or more optical elements; detecting, with one or more light sensors, a reflected beam comprising at least a portion of the assessment beam reflected and/or transmitted by at least one of the one or more optical elements; and determining, with a control system, whether the one or more optical elements exhibit an optical anomaly based at least in part on assessment data comprising data from the one or more light sensors; wherein the one or more optical elements are utilized by, or define a portion of, an energy beam system and/or an imaging system of an additive manufacturing machine, the energy beam system configured to emit an energy beam utilized in an additive manufacturing process, and the imaging system configured to monitor one or more operating parameters of the additive manufacturing process.

43. The computer-readable medium of any clause herein, wherein determining whether the one or more optical elements exhibit an optical anomaly comprises: receiving, by the control system, reference data and assessment data, the reference data comprising data from at least one of the one or more light sensors corresponding to a first reflected beam comprising at least a portion of the assessment beam reflected and/or transmitted by a first optical element, and the assessment data comprising data from at least one of the one or more light sensors corresponding to a second reflected beam comprising at least a portion of the assessment beam reflected and/or transmitted by a second optical element; comparing, by the control system, the assessment data to the reference data, wherein comparing comprises determining a difference between the assessment data and the reference data; and determining, with the control system, whether the second optical element exhibits an optical anomaly based at least in part on the difference between the assessment data and the reference data exceeding a threshold value.

44. A computer-readable medium comprising computer-executable instructions, which when executed by a processor associated with an additive manufacturing system, cause the additive manufacturing system to perform a method comprising: determining an operational state and/or a remedial event for an additive manufacturing machine, the operational state and/or the remedial event determined based at least in part on one or more optical anomalies having been determined upon one or more optical elements based at least in part on assessment data from a light sensor, the one or more optical elements utilized by, or defining a portion of, an energy beam system configured to emit one or more energy beams to additively manufacture a three-dimensional object, the light sensor having detected a reflected portion of an assessment beam, the assessment beam emitted by a light source and the reflected portion reflected by the one or more optical elements, wherein the operational state comprises a nominal operational state and/or an augmented operational state, and wherein the remedial event comprises a maintenance event and/or a replacement event; additively manufacturing the three-dimensional object at least in part using nominal operating conditions when the operational state comprises a nominal operational state; and additively manufacturing the three-dimensional object at least in part using one or more augmented operating conditions when the operational state comprises an augmented operational state; and/or performing a maintenance operation upon having determined the remedial event that comprises the maintenance event, the maintenance operation comprising cleaning and/or calibrating the one or more optical elements and/or one or more components of the energy beam system; and/or performing a replacement operation upon having determined the remedial event that comprises the replacement event, the replacement operation comprising replacing the one or more optical elements.

45. The computer-readable medium of any clause herein, comprising computer-executable instructions, which when executed by a processor associated with an additive manufacturing system, cause the additive manufacturing machine or system to perform the method of any clause herein.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine, comprising:
   an energy beam system configured to emit an energy beam utilized in an additive manufacturing process;
   first and second optical elements utilized by, or defining a portion of, the energy beam system and/or an imaging system of the additive manufacturing machine, the imaging system configured to monitor one or more operating parameters of the additive manufacturing process;
   a light source configured to emit an assessment beam that follows an optical path incident upon the first and second optical elements;
   one or more light sensors configured to detect a reflected beam that is either refracted by the first optical element, internally reflected by a proximal surface and a distal surface of the first optical element, or reflectively propagated between the distal surface of the first optical element and a proximal surface of the second optical element, the reflected beam comprising at least a portion of the assessment beam; and
   a control system configured to determine, based at least in part on assessment data comprising data from the one or more light sensors, whether at least one of the first and second optical elements exhibits an optical anomaly.

2. The additive manufacturing machine of claim 1, wherein the light source comprises an energy beam source of the energy beam system, and wherein the assessment beam emitted by the light source has a first energy level and the energy beam utilized in the additive manufacturing process has a second energy level when the energy beam is utilized to additively manufacture a three-dimensional object, and wherein the first energy level is less than the second energy level.

3. The additive manufacturing machine of claim 1, wherein the light source is utilized by the imaging system.

4. The additive manufacturing machine of claim 1, wherein the first and second optical elements comprise a window that separates one or more components of the energy beam system and/or the imaging system from a process chamber within which powder material is irradiated by the energy beam during the additive manufacturing process.

5. The additive manufacturing machine of claim 1, further comprising:
   a scanner configured to orient the assessment beam to a scanner position, the scanner position mapped to a scan field corresponding to the first and second optical elements; and
   wherein the control system is configured to determine a beam incidence location based at least in part on the scanner position corresponding to the data from the one or more light sensors.

6. The additive manufacturing machine of claim 5, wherein the beam incidence location is determined at least in part by mapping the scanner position to the data from the one or more light sensors.

7. The additive manufacturing machine of claim 1, wherein the control system is configured to determine whether at least one of the first and second optical elements exhibit an optical anomaly based at least in part on a comparison of the assessment data to reference data.

8. The additive manufacturing machine of claim 7, wherein the reference data comprises a threshold value.

9. The additive manufacturing machine of claim 1, wherein the control system is configured to determine location coordinates of the optical anomaly on at least one of the first and second optical elements.

10. The additive manufacturing machine of claim 1, wherein the first optical element is a proximal optical element and the second optical element is a distal optical element.

11. The additive manufacturing machine of claim 1, wherein the one or more light sensors are configured to detect the reflected beam at a perimeter edge of the first optical element.

12. A method of determining an optical anomaly exhibited by an optical element utilized in an additive manufacturing machine, the method comprising:
   emitting, with a light source, an assessment beam that follows an optical path incident upon first and second optical elements;
   detecting, with one or more light sensors, a reflected beam comprising at least a portion of the assessment beam that is either refracted by the first optical element, internally reflected by a proximal surface and a distal surface of the first optical element, or reflectively propagated between the distal surface of the first optical element and a proximal surface of the second optical element; and
   determining, with a control system, whether at least one of the first and second optical elements exhibit an optical anomaly based at least in part on the assessment data comprising data from the one or more light sensors; and
   wherein the first and second optical elements are utilized by, or define a portion of, an energy beam system and/or an imaging system of an additive manufacturing machine, the energy beam system configured to emit an energy beam utilized in an additive manufacturing process, and the imaging system configured to monitor one or more operating parameters of the additive manufacturing process.

13. The method of claim 12, wherein detecting, with the one or more light sensors, the reflected beam comprises detecting, with the one or more light sensors, the reflected beam at a perimeter edge of the first optical element.

14. The method of claim 12, further comprising determining, with the control system, whether at least one of the first and second optical elements exhibit an optical anomaly based at least in part on a comparison of the assessment data to reference data.

15. The method of claim 12, further comprising determining, with the control system, location coordinates of the optical anomaly on at least one of the first and second optical elements.

16. The method of claim 12, further comprising:
orienting, with a scanner, the assessment beam to a scanner position, the scanner position mapped to a scan field corresponding to the first and second optical elements; and
determining, with the control system, a beam incidence location based at least in part on the scanner position corresponding to the data from the one or more light sensors.

17. The method of claim 12, wherein the light source comprises an energy beam source of the energy beam system, and further comprising emitting the assessment beam by the light source at a first energy level, and wherein the energy beam utilized in the additive manufacturing process has a second energy level when the energy beam is utilized to additively manufacture a three-dimensional object, and wherein the first energy level is less than the second energy level.

18. A non-transitory computer-readable medium comprising computer-executable instructions, which when executed by a processor associated with an additive manufacturing system, cause the additive manufacturing system to perform a method comprising:

emitting, with a light source, an assessment beam that follows an optical path incident upon first and second optical elements;
detecting, with one or more light sensors, a reflected beam comprising at least a portion of the assessment beam that is either refracted by the first optical element, internally reflected by a proximal surface and a distal surface of the first optical element or reflectively propagated between the distal surface of the first optical element and a proximal surface of the second optical element; and
determining, with a control system, whether at least one of the first and second optical elements exhibit an optical anomaly based at least in part on the assessment data comprising data from the one or more light sensors; and
wherein the one or more optical elements are utilized by, or define a portion of, an energy beam system and/or an imaging system of an additive manufacturing machine, the energy beam system configured to emit an energy beam utilized in an additive manufacturing process, and the imaging system configured to monitor one or more operating parameters of the additive manufacturing process.

19. The non-transitory computer-readable medium of claim 18, wherein detecting, with the one or more light sensors, the reflected beam comprises:
detecting, with the one or more light sensors, the reflected beam at a perimeter edge of the first optical element.

20. The non-transitory computer-readable medium of claim 19, wherein determining whether at least one of the first and second optical elements exhibit an optical anomaly comprises:
determining, with the control system, whether at least one of the first and second optical elements exhibit an optical anomaly based at least in part on a comparison of the assessment data to reference data.

* * * * *